United States Patent

Ishihara et al.

[11] Patent Number: 5,252,693
[45] Date of Patent: Oct. 12, 1993

[54] SYNDIOTACTIC STYRENE POLYMERS

[75] Inventors: Nobuhide Ishihara, Sodegaura; Masahiko Kuramoto; Michitake Uoi, both of Ichihara, all of Japan

[73] Assignee: Idemitsu Kosan Company Limited, Tokyo, Japan

[21] Appl. No.: 693,375

[22] Filed: Apr. 30, 1991

Related U.S. Application Data

[63] Continuation-in-part of Ser. No. 416,914, Oct. 4, 1989, which is a continuation-in-part of Ser. No. 175,581, Mar. 28, 1988, abandoned, which is a continuation of Ser. No. 888,153, Jul. 18, 1986, abandoned, said Ser. No. 416,914, is a continuation-in-part of Ser. No. 138,914, Dec. 28, 1987, abandoned.

[30] Foreign Application Priority Data

Jan. 28, 1987 [JP] Japan ................... 62-17973

[51] Int. Cl.$^5$ .............. C08F 12/08; C08F 212/08
[52] U.S. Cl. ................... 526/347; 526/274; 526/279; 526/286; 526/293; 526/334; 526/346; 526/347.1; 526/347.2
[58] Field of Search ........ 526/346, 347, 347.1, 526/347.2, 274, 279, 286, 293, 334

[56] References Cited

U.S. PATENT DOCUMENTS 3,009,206 11/1961 Salyer et al. ................ 264/235
4,680,353 7/1987 Ishihara et al. ............ 526/347.2 X
4,808,680 2/1989 Schmidt et al. ................ 526/160

OTHER PUBLICATIONS

Grassi et al, "Selective Synthesis of Syndiotactic Polystyrene," Gazzetta Chimica Italiana, 117, 249–250, 1987.

T. Kawamura, "Stereoregularity of Polystyrene Derivatives 4," Makromol. Chem., 183(7), 1647–1652, 1982.
T. Kawamura, "Stereoregularity of Polystyrene Derivatives 2," Makromol. Chem., 183(1), 143–151, 1982.
T. Kawamura, "Stereoregularity of Polystyrene Derivatives, 3," Makromol. Chem., 183(1), 153–162, 1982.
Kawamura, "Stereoregularity of Polystyrene Derivatives, 1", Makromol. Chem., 183(1), 125–141, 1982.
Braun et al., "The Tacticity of Poly-α-Methylstyrenes . . . ", Berichte der Bunsengesellschaft, 68(10), 959–64 (1964).

*Primary Examiner*—Fred Teskin
*Attorney, Agent, or Firm*—Oblon, Spivak, McClelland, Maier & Neustadt

[57] ABSTRACT

Styrene homo-or-co- polymers, the stereoregularity of which is mainly syndiotactic are disclosed, having repeating unit or two or more different repeating units defined by a general formula (I):

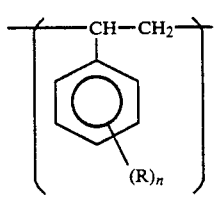

wherein each R may be the same or different. And a method of preparation of syndiotactic copolymers wherein there are two different repeating units represented by formula (I); wherein the polymerization is carried out with a catalyst comprising (a) a titanium compound and (b) a contact product of a organoaluminum compound and a condensing agent such as water.

5 Claims, 19 Drawing Sheets

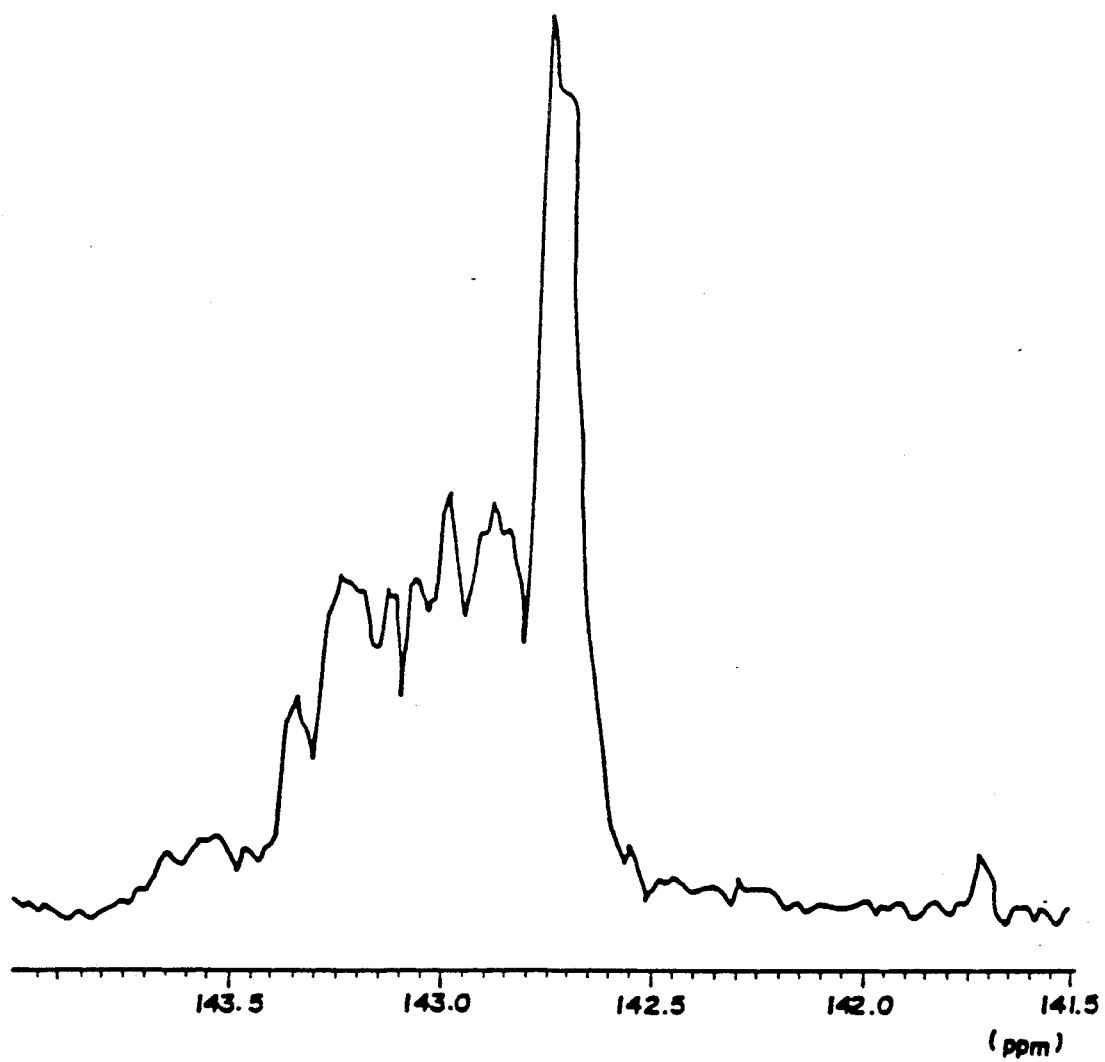

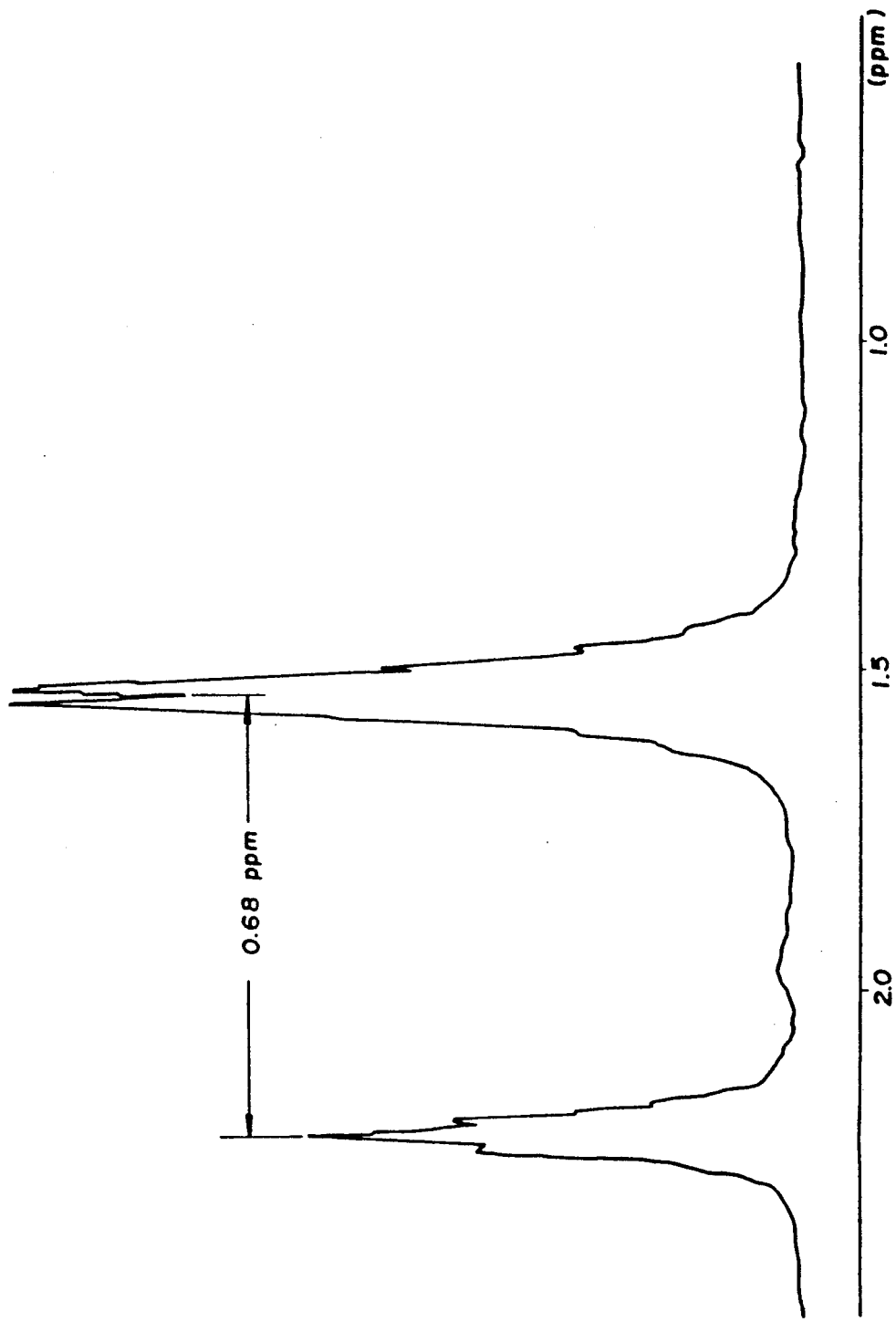

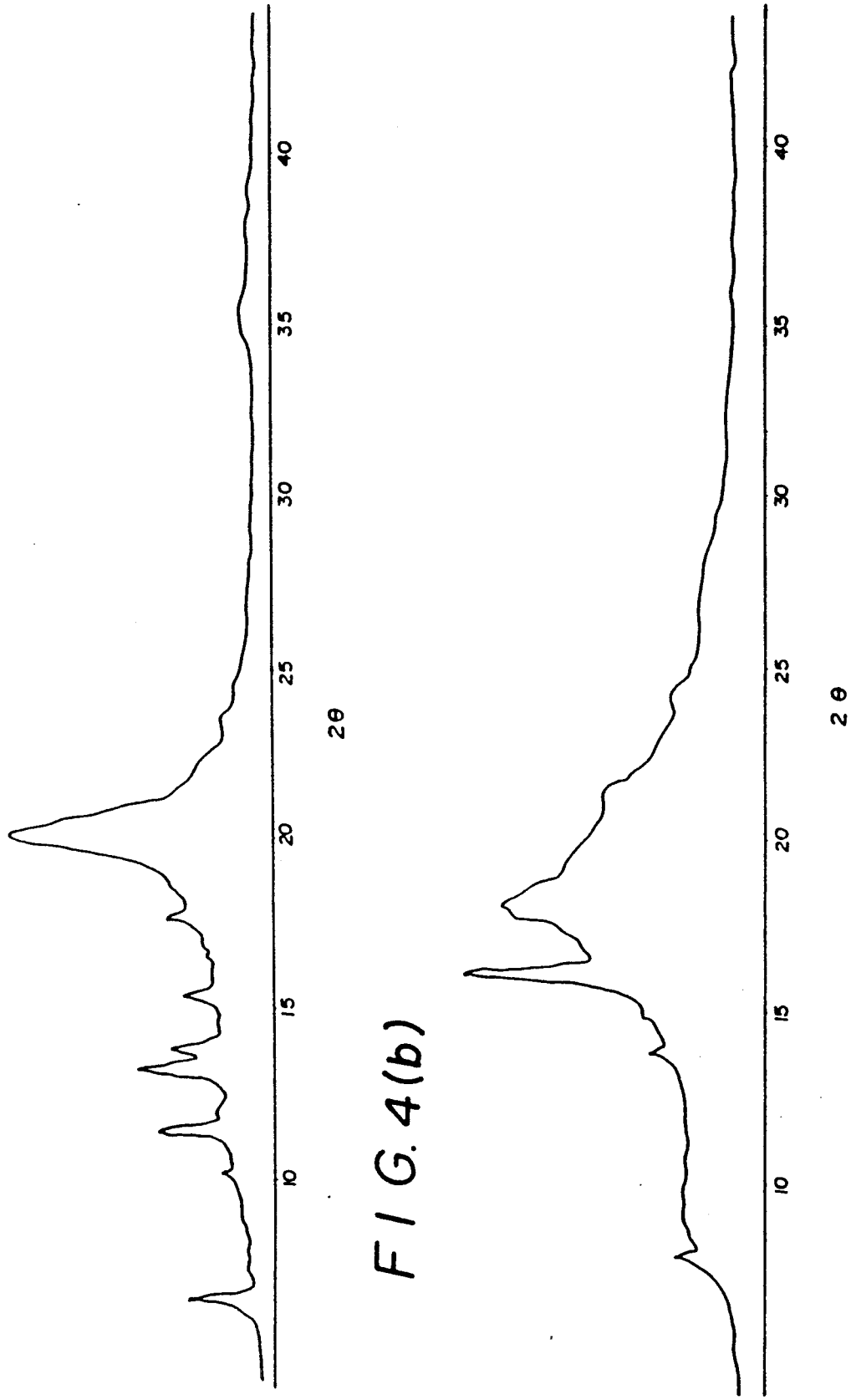

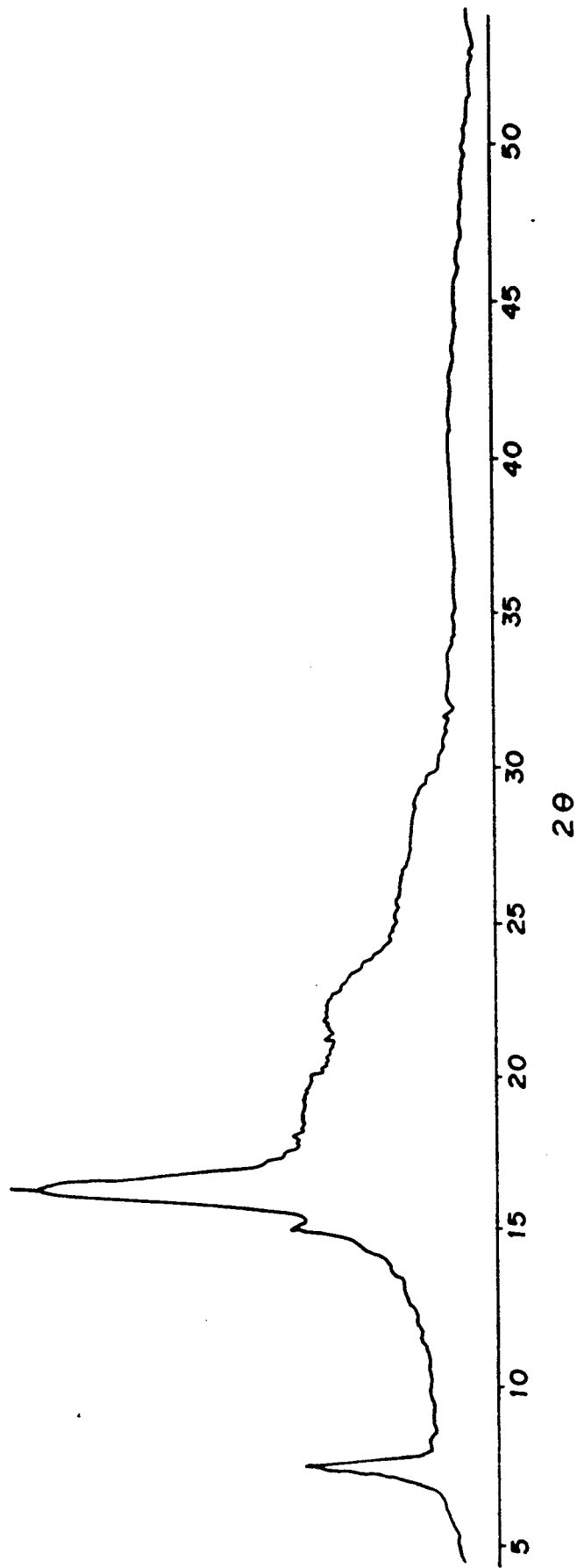

wave number wave number wave number

SYNDIOTACTIC STYRENE POLYMERS

This is a continuation-in-part of U.S. patent application Ser. No. 07/416,914 filed Oct. 4, 1989 which is a continuation-in-part of U.S. patent application Ser. No. 07/175,581 filed Mar. 28, 1988 (abandoned) which is a continuation of Ser. No. 06/888,153 filed Jul. 18, 1986 (abandoned). Ser. No. 07/416,914 is also a continuation-in-part of Ser. No. 07/138,914 filed Dec. 28, 1987 (abandoned).

BACKGROUND OF THE INVENTION

The present invention relates to styrene polymers including homopolymers and copolymers having a new stereoregular structure and more particularly to styrene polymers in which the stereoregular structure of said chains relative to the polymer main chain is mainly syndiotactic.

As is well known, styrene homopolymers such as polystyrene and polyparamethylstyrene, and styrene copolymers are generally produced by technique such as radical polymerization, anionic polymerization, cationic polymerization and polymerization using Ziegler-type catalysts. These styrene polymers are divided into three groups, isotactic, syndiotactic and atactic polymers, depending on the steric configuration of side chains thereof. It has heretofore been known that usual radial, anionic and cationic polymerization methods provide styrene polymers having mainly an atactic structure, and that the polymerization methods using Ziegler-type catalyst provide styrene polymers having mainly an isotactic structure.

SUMMARY OF THE INVENTION

The present invention is intended to provide styrene polymers having a syndiotacic structure. As a result of extensive investigations, it has been found that polymerization of styrene monomers in the presence of a catalyst comprising specific transition metal compounds and organometallic compounds results in styrene polymers of high syndiotactic structure.

The present invention relates to a styrene polymer having a single repeating unit (homopolymer) or at least two different repeating units (copolymer) which can be represented by the formula (I):

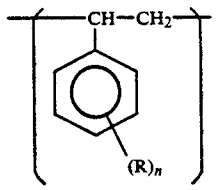

(wherein each R is individually selected from hydrogen atom, a halogen atom or a substituent containing a carbon atom, an oxygen atom, a nitrogen atom, a sulfur atom, a phosphorus atom or a silicon atom, and n represents an integer of 1 to 3), having a degree of polymerization of not less than 5, and having a stereoregular structure which is mainly syndiotactic.

The present invention further relates to a process for producing styrene copolymers which comprises copolymerizing at least one styrene-based monomer represented by the general formula (A'):

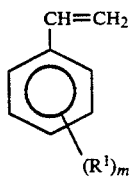

(wherein R' and m have definition selected from the definitions as R and n respectively in the general formula (I) and different styrene-based monomer represented by the general formula (B')):

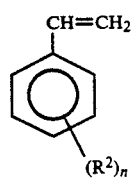

(wherein $R^2$ and n are selected from the same definitions as R and n respectively in the general formula (I)) (excluding the same as the styrene-based monomer or monomers of the general formula (A')) in the presence of a catalyst comprising (a) a titanium compound and (b) a reaction product of an organoaluminum compound, and water as a condensing agent.

BRIEF DESCRIPTION OF THE DRAWINGS

FIG. 4 shows X-ray diffraction patterns of styrene polymers produced in examples: (a) indicates polystyrene produced in Example 1, (b) indicates isotactic polystyrene produced in Comparative Example 2 and (c) indicates poly(p-methylstyrene) produced in Example 23; and In FIG. 4, the symbol θ indicates a Bragg angle (°).

FIGS. 1A($a_1$), 1A($a_2$), 2A, 3A, 4A($a_1$), 4A($a_2$), 5A($a_1$), 5A($a_2$), 6A, 7A, 8A, 9A($a$), 10A, 11A($a$), 12A($a$), 13A, 14A, 15A, 16A, 17A, 18A, 19A, 20A and 21A represent $^{13}$C-NMR spectra of the styrene copolymers obtained in the examples and comparative examples.

DETAILED DESCRIPTION OF THE INVENTION

Figure 1A:
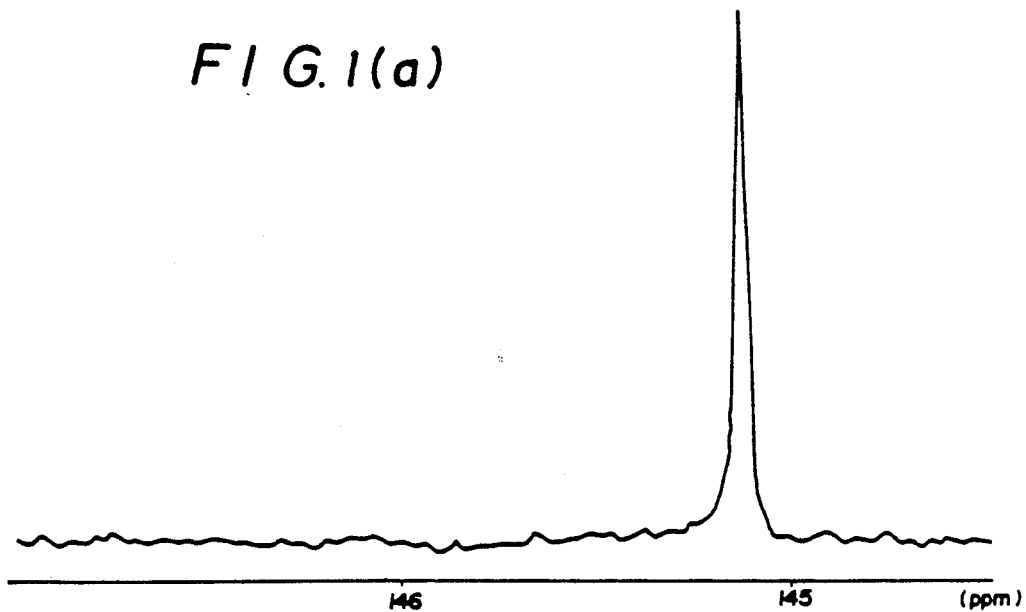
FIGS. 1A($b$), 4A($b$), 5A($b$), 9A($b$), 11A($b$), 12A($b$) and 14A($b$) represent the $^1$H-NMR spectra of the polymers or copolymers obtained in the examples and comparative examples.

The styrene polymers of the present invention have one or more different structure units (repeating unit) represented by the above general formula (I) and include, as well as polystyrene, various nucleus-substituted polystyrenes such as poly(alkyl-styrene), poly(-halogenated styrene) and copolymers thereof.

Each R or R$^1$or R$^2$ in the formulas herein, can be selected from among hydrogen, a halogen such as chlorine, bromine and iodine, or a substituent containing carbon, oxygen, nitrogen, sulfur, phosphorus, or silicon.

Representative example of the carbon atom-containing substituent are an alkyl group having 1 to 20 carbon atoms (e.g., a methyl group, an ethyl group, an isopropyl group and a tert-butyl group), and a halogen-substituted alkyl group having 1 to 20 carbon atoms (e.g., a chloromethyl group, a bromomethyl group and a chloroethyl group).

Representative examples of the carbon atom and oxygen atom-containing substituents are an alkoxy group having 1 to 10 carbom atoms (e.g., a methoxy group, an ethoxy group and an isopropoxy group), and a carboxyester having 1 to 10 carbon atoms (e.g., a carboxymethylester group and a carboxyethylester group).

Representative examples of the carbon atom and silicon atom-containing substituent are an alkylsilyl group (e.g., a trimethylsilyl group).

Representative examples of the carbon atom and nitrogen atom-containing substituent are an alkylamino group having 1 to 20 carbon atoms (e.g., a dimethylamino group), and a cyano group.

Representative examples of the sulfur atom-containing substituent are a sulfonyl group, a sulfonic acid alkyl ester group, an alkylthio group and a mercapto group.

Representative example of the phosphorus atom-containing substituent ae a phosphoric acid ester group, a phosphorus acid ester group and an alkylphosphinyl group.

Representative examples of the styrene polymers of the present invention are polystyrene; poly(alkylstyrene) such as poly(p-methylstyrene), poly(m-methylstyrene), poly(o-methylstyrene), poly(2,4-dimethylstyrene), poly(2,5-dimethylstyrene), poly(3,4-dimethylstyrene), poly(3,5-dimethylstyrene) and poly(p-tert-butylstyrene); poly(halogenated styrene) such as poly(p-chlorostyrene), poly(m-chlorostyrene), poly(o-chlorostyrene), poly(p-bromostyrene), poly(m-bromo-styrene), poly(o-bromostyrene), poly(p-fluorostyrene), poly(m-fluorostyrene), poly(o-fluorostyrene) and poly(o-methyl-p-fluorostyrene); poly(halogen-substituted alkyl-styrene) such as poly (p-chloromethylstyrene), poly(m-chloromethylstyrene) and poly(o-chloromethylstyrene); poly-(alkoxystyrene) such as poly(p-methoxystyrene), poly(m-methoxystyrene), poly(o-methoxystyrene) poly(p-ethoxystyrene), poly(m-ethoxystyrene) and poly(o-ethoxystyrene); poly(carboxy-esterstyrene) such as poly(p-carboxymethylstyrene), poly(m-carboxymethylstyrene) and poly(o-carboxymethylstyrene); poly(alkyletherstyrene) such as poly(p-vinylbenzylpropyl-ether); poly(alkylsilylstyrene) such as poly(p-trimethyl-silylstyrene); poly(ethyl vinylbenzenesulfonate); and poly-(vinylbenzyldimethoxyphosphide); and copolymers thereof.

When the styrene polymer of the present invention is a copolymer of two or more different monomers then the different repeating units represented by formula (I) can be represented as (A) and (B), below. That is, the styrene polymers of the present invention relate to styrene copolymers which comprise at least one structural unit represented by the general formula (A):

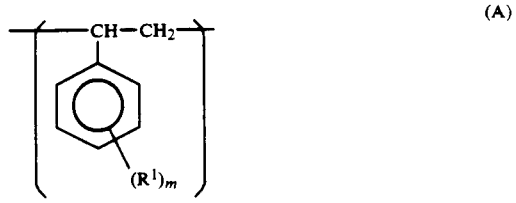

(A)

(wherein R$^1$ (as defined above) can be a hydrogen atom, a halogen atom, or a carbon, oxygen, nitrogen, sulfur, phosphorus or silicon-containing group, m is 1, 2 or 3, and when m is 2 or 3, R's may be the same or different) and a structural unit represented by the general formula (B):

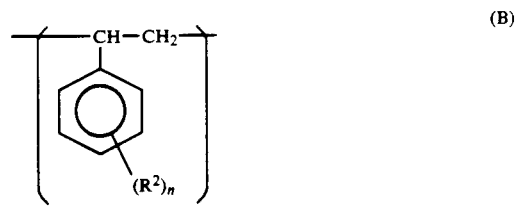

(B)

(wherein R$^2$ (as defined above) can be a hydrogen atom, a halogen atom, or a carbon, oxygen, nitrogen, sulfur, phosphorus or silicon-containing group, n is 1, 2 or 3, and when n is 2 or 3, R$^2$s may be the same or different) (excluding the same as the structural unit;

Representative example of resulting copolymer units are shown below.

Alkylstyrene units such as a styrene unit, a p-methylstyrene unit, a m-methylstyrene unit, an o-methylstyrene unit, a 2,4-dimethylstyrene unit, a 2,5-dimethylstyrene unit, a 3,4-dimethylstyrene unit, a 3,5-dimethylstyrene unit and a p-tert-butylstyrene unit; halogenated styrene units such as a p-chlorostyrene unit, a m-chlorostyrene unit, an o-chlorostyrene unit, a p-bromostyrene unit, a m-bromostyrene unit, an o-bromostyrene unit, a p-fluorostyrene unit, a m-fluorostyrene unit, an o-fluorostyrene unit and an o-methyl-p-fluorostyrene unit; halogen-substituted alkylstyrene units such as a p-chloromethylstyrene group, a m-chloromethylstyrene unit and an o-chloromethylstyrene unitl alkoxystyrene units such as a p-methoxystyrene unit, a m-methoxystyrene, an o-methoxystyrene unit, a p-ethoxystyrene unit, a m-ethoxystyrene unit and an o-ethoxystyrene unit;

carboxyesterstyrene units such as p-carboxymethylstyrene unit, a m-carboxymethylstyrene unit and an o-carboxymethylstyrene unit; alkyletherstyrene units such as a p-vinylbenzylpropyl ether unit; alkylsilylstyrene units such as a p-trimethylsilystyrene unit; ethyl vinylbenzenesulfonate unit, and vinylstyrene units such as a vinylbenzyldimethoxy phosphide unit and a p-vinylstyrene unit.

STEREOREGULARITY

The stereoregular structure of the styrene polymers of the present invention is mainly syndiotactic; that is, the styrene polymers of the present invention have such a steric configuration that phenyl groups or substituted phenyl groups as side chains are positioned alternately on the opposite sides in relation to the main chain comprising carbon-carbon bond. The tacticity of the styrene polymers is determined by the nuclear magnetic resonance (NMR) method.

More specifically, the tacticity of the styrene polymers is determined by analyzing the signal of $C_1$ carbon of an aromatic ring and the signal of methine.methylene carbon in $^{13}$NMR (nuclear magnetic resonance spectrum as measured using an isometric carbon), or the proton signal of $^1$H-NMR.

The tacticity can be determined by NMR for each given number of constituting units connected continuously, such as a diad in which the number of constituting units is two, a triad in which the number of constituting units is three, and a pentad in which the number of constituting units is five. The term "polymer having mainly a syndiotactic structure" as used herein means that the polymer has such a syndiotactic structure that the syndiotacticity expressed in terms of the diad is not less than 85%, or the syndiotacticity expressed in terms of the pentad is not less than 30% and preferably not less than 50%.

However, the degree of syndiotacticity which has been obtained varies somewhat depending on the presence and type of the substituent or substituents in the structural units (I) (or (A) and (B)). Thus, styrene polymers not always satisfying the above-defined value ranges but wherein the degree of syndiotacity is increased over conventional styrene polymers are also included in the present invention. Thus, styrene polymers having mainly a syndiotactic structure of the present invention include the following polymers; polystyrene in which the syndiotacticity expressed in terms of the diad is not less than 75%, or the syndiotacticity expressed in terms of the pentad is not less than 30%;

Poly(p-methylstyrene) in which the syndiotacticity expressed in terms of the diad is not less than 75%, or the syndiotacticity expressed in terms of the pentad is not less than 30%;

poly(m-methylstyrene) in which the syndiotacticity expressed in terms of the diad is not less than 75%, or the syndiotacticity expressed in terms of the pentad is not less than 35%;

poly(o-methylstyrene) in which the syndiotacticity expressed in terms of the diad is not less than 85%, or the syndiotacticity expressed in terms of the pentad is not less than 30%;

poly(o-methoxystyrene) in which the syndiotacticity expressed in terms of the diad is not less than 80%, or the syndiotacticity expressed in terms of the pentad is not less than 40%, and poly(p-methoxystyrene) in which the syndiotacticity expressed in terms of the diad is not less than 75%, or the syndiotacticity expressed in terms of the pentad is not less than 30%;

When the styrene polymers of the present invention are copolymers, the syndiotactic arrangement exists not only between the structural units (A) and (A), and between the structural units (B) and (B), but also between the structural units (A) and (B); that is, the styrene copolymers of the present invention have a cosyndiotactic structure.

The styrene polymers of the present invention may be block polymers, random polymers, alternating monomer polymers, etc.

The styrene polymers of the present invention are not limited to the above specified styrene polymers and do not have to be a single compound. That is, the styrene polymers of the present invention include, as well as the above specified styrene polymers, mixtures of the above specified styrene homo-and copolymers and isotactic or atactic styrene homo-and/or copolymers and the above specified styrene polymers with isotactic or atactic styrene homo-and copolymers incorporated therein.

Copolymers with the styrene polymers of the present invention incorporated in the chain thereof are also included in the scope of the present invention as long as their syndiotacticity falls within the above-defined range. In addition, the styrene polymers of the present invention may be mixtures of styrene polymers having different molecular weights.

The styrene polymers of the present invention have a degree of polymerization of not less than 5, preferably not less than 10.

The styrene polymers of the present invention, having the desired stereoregularity and substituent can be produced by polymerizing the corresponding monomers, or by applying treatment such as fractionation, blending and organic preparation techniques to polymers produced.

The styrene polymers of the present invention can be produced by polymerizing styrene monomers such as styrene and styrene derivatives, e.g., alkylstyrene and halogenated styrene in the presence of a catalyst comprising a titanium compound, e.g., titanium halide and alkoxytitanium, and an organoaluminum compound, e.g., alkylaluminoxane.

If the styrene polymer is a copolymer of the present invention, it can be produced by copolymerizing at least one styrene-based monomer represented by the general formula (A'):

(wherein R' and m are the same as defined above) and two or more styrene-based monomers represented by the general formula (B'):

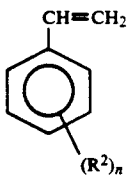

(B')

(wherein R² and n are the same as defined above) in the presence of a catalyst comprising (a) a titanium compound and (b) a reaction product of an organoaluminum compound, and water as a a condensing agent.

Styrene polymers produced by the above polymerization method have a high syndiotacticity which have not yet been obtained, without application of treatment such as fractionation. Application of fractionation treatment using a suitable solvent provides styrene polymers the syndiotacticity of which is nearly 100%. The styrene polymers of the present invention, having the desired tacticity can be produced by blending the above styrene polymers having a syndiotacticity of nearly 100% with atactic or isotactic styrene polymers by known techniques. It is well known that various substituents are introduced into automatic rings of styrene polymers by organic chemical techniques such as chloromethylation. The styrene polymers having various substituents in the aromatic ring thereof of the present invention can be prepared by the above method using the styrene polymers of the present invention as a base polymer while maintaining the tacticity thereof.

The styrene Homo-and Co-polymers of the present invention are novel in that they have, as described above, a stereoregular molecular structure which conventional styrene polymers do not have. Styrene polymers undergoing crystallization are excellent in heat resistance and also in chemical resistance as compared with commonly used atactic polystyrene. Thus these styrene polymers can be used as materials for use in production of molded articles which are needed to have high heat resistance and chemical resistance. Styrene polymers in which a functional substituent is introduced in the benzene ring as a side chain can be widely used as functional polymers.

CATALYST

The catalyst for preparing syndiotactic polystyrene according to the present invention comprises (a) a titanium compound and (b) a reaction product of an organoaluminum compound, and water as a condensing agent.

As the titanium component (a), various titanium compounds can be used. Preferably the titanium component (a) is at least one titanium compound selected from titanium compounds and titanium chelate compounds represented by the general formula (C):

$$TiR^3_a R^4_b R^5_c X^1_{4-(a+b+c)} \quad (C)$$

or the general formula (D):

$$TiR^3_d R^4_e X^1_{3-(d+e)} \quad (D)$$

(wherein R³, R⁴ and R⁵ are each a hydrogen atom, an alkyl group having 1 to 20 carbon atoms, an alkoxy group having 1 to 20 carbon atoms, an aryl group having 6 to 20 carbon atoms, an alkylaryl group having 6 to 20 carbon atoms, an arylalkyl group having 6 to 20 carbon atoms, an acyloxy group having 1 to 20 carbon atoms, a cyclopoentadienyl group, a substituted cyclopentadienyl group or an indenyl group, X¹ is a halogen atomn, a, b and c are each an integer of 0 to 4, and d and e are each an integer of 0 to 3).

Representative examples of the alkyl group having 1 to 20 as represented by R³, R⁴ or R⁵ are a methyl group, an ethyl group, a propyl group, a butyl group, an amyl group, an isoamyl group, an isobutyl group, an octyl group and a 2-ethylhexyl group.

Representative examples of the alkoxy group having 1 to 20 carbon atoms are a methoxy group, an ethoxy group, a propoxy group, a butoxy group, an amyloxy group, a hexyloxy group and a 2-ethylhexyloxy group.

Representative examples of the aryl, alkylaryl or arylalkyl having 6 to 20 carbon atoms are a phenyl group, a tolyl group, a xylyl group and a benzyl group. are usually used. Representative examples of the organo-aluminum compound of the general formula (F) are trimethylaluminum, triethylaluminum and triisobutylaluminum. Of these compounds, trimethylaluminum is most preferred.

The condensing agent to be condensed with the above organoaluminum compound is water.

An example of the reaction product between an alkyl-aluminum compound, which is a typical example of the organoaluminum compound component, and water is alkylaluminoxane represented by the following general formula (G):

(G)

(wherein R⁹ is a alkyl group having 1 to 8 carbon atoms, and j is a number of 2 to 50).

The reaction between the organoaluminum compound and water is not critical and can be carried out by known techniques. For example, (1) a method in which the organoaluminum compound is dissolved in an organic solvent and then is brought into contact with water; (2) a method in which the organoaluminum compound is added at the time of polymerization and then water is added; and (3) a method in which water of crystallization contained in, e.g., metal salts, or water adsorbed on organic or inorganic substances is reacted with the organoaluminum compound can be employed.

In the catalyst for use in the process of the present invention the organoaluminum component (b) can be used as a single compound. In addition, the component (b) can be used in admixture with other organoaluminum compounds represented by the general formula (F) or other organometallic compounds, or can be used in the form that it is adsorbed or deposited on inorganic substances and so forth. formula (F) or other organometallic compounds, or can be used in the form that it is adsorbed or deposited on inorganic substances and so forth.

The catalyst for use in the process of the present invention contains the above components (a) and (b) as main components. In addition to the components (a) and (b), if desired, other catalyst components can be added.

The ratio of the component (a) to the component (b) in the catalyst of the present invention varies with the type of each component, the type of the styrene starting material, and other conditions, and thus cannot be determined unconditionally. Usually, however, the molar ratio of aluminum in the component (b) to titanium in the component (a), i.e., aluminum/titanium, is preferably 1:1 to $1 \times 10^6:1$ and more preferably 10:1 to $1 \times 10^4:1$.

In accordance with the process of the present invention, at least one styrene-based monomer represented by the general formula (A') and at least one styrene-based monomer represented by the general formula (B') are copolymerized. The styrene-based monomer represented by the general formula (A') forms a first structural unit of the general formula (A), and the styrene-based monomer represented by the general formula (B') forms the structural unit of the general formula (B) in the course of the copolymerization reaction. Thus, as representative examples of the styrene-based monomers represented by the general formulae (A') and (B'), compounds corresponding to the representative examples of the structural units (A') and (B) can be listed (both of which are represented by general formula (I)).

In accordance with the process of the present invention, two or more styrene-based monomers as described above are copolymerized in the presence of a catalyst containing the above components (a) and (b). This polymerization may be bulk polymerization or solution polymerization. In the solution polymerization, as the solvent, aliphatic hydrocarbons such as pentane, hexane and heptane, alicyclic hydrocarbons such as cyclohexane, aromatic hydrocarbons such as benzene, toluene and xylene, and so on can be used. The polymerization temperature is not critical; it is usually 0° to 90° C. and preferably 20° to 70° C.

In order to control the molecular weight of the sytrene copolymer to be formed, it is effective to perform the copolymerization reaction in the presence of hydrogen. In this case, the partial pressure of hydrogen is appropriately chosen within the range of 0.01 to 50 kg/cm$^2$.

A representative example of the acyloxy group having 1 to 20 carbon atoms is a heptadecylcarbonyloxy group.

Representative examples of the substituted cyclopentadienyl group are a methylcyclopentadienyl group, a 1,2-dimethylcyclopentadienyl group and a pentamethylcyclopentadienyl group.

In the general formulae (C) and (D), $R^3$, $R^4$ and $R^5$ may be the same or different.

$X^1$ is a halogen atom, i.e., chlorine, bromine, iodine or fluorine.

a, b and c are each an integer of 0 to 4.

d and e are each an integer of 0 to 3.

Representative examples of the tetravalent titanium compounds and titanium chelate compounds represented by the general formula (C) are methyltitanium trichloride, titanium tetramethoxide, titanium tetraethoxide, titanium monoisopropoxy trichloride, titanium diisopropoxy dichloride, titanium triisopropoxy monochloride, tetra(2-ethylhexyloxy)titanium, cyclopentadienyltitanium trichloride, biscyclopentadienyltitanium dichloride, titanium tetrachloride, titanium tetrabromide, bis(2,4-pentanedionate)titanium oxide, bis(2,4-pentanedionate)titanium dichloride, and bis(2,4-pentanedionate)titanium dibutoxide.

In addition, as the titanium component (a), condensed titanium compounds represented by the general formula (E):

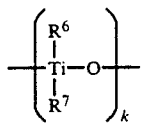

(wherein $R^6$ and $R^7$ are each a halogen atom, an alkoxy group having 1 to 20 carbon atoms, or an acyloxy group, and k is a number of 2 to 20) can be used.

The above titanium compounds can be used in a state that they are adsorbed or deposited on a carrier such as magnesium compounds, silica and alumina, or in the form of complexes with esters or ethers, for example.

Representative examples of the trivalent titanium compounds represented by the above general formula (D) as the titanium component (a) are titanium trihalide such as titanium trichloride and cyclopentadienyltitanium compounds such as cyclopentadienyltitanium dichloride. In addition, compounds resulting form reduction of tetravalent titanium compounds can be used. These trivalent titanium compounds may be used in the form of complexes with esters or ethers, for example.

The component (b) to be used in combination with the above titanium component (a) is prepared by reacting organoaluminum compound and water.

As the organoaluminum compound to be used in the component (b), organoaluminum compounds (trialkylaluminum) represented by the general formula (F):

$$AlR^8_3 \qquad (F)$$

(wherein $R^8$ is an alkyl group having 1 to 8 carbon atoms)

HOMOPOLYMERS

EXAMPLE 1

(1) Preparation of Catalyst Component

Trimethylaluminum (47.4 milliliters (ml): 492 millimoles (mmol)) was added to 200 ml of toluene as a solvent, and then 35.5 grams (g) (142 mmol) of copper sulfate pentahydrate (CuSO$_4$.5H$_2$O) was added thereto. These ingredients were reacted at 20° C. for 24 hours. When the reaction was completed, the toluene solvent was removed by filtration to obtain 12.4 g of methylaluminoxane.

(2) Production of Polystyrene

A mixture of 100 ml of toluene and 40 mmol (calculated as an aluminum atom) of methylaluminoxane was placed in a glass vessel (internal volume: 500 ml) equipped with a stirrer, and then 0.05 mmol. of cyclopentadienyltitanium trichloride was added thereto. Subsequently 180 ml of styrene was added at 20° C. and polymerized for 1 hour. Then methanol was poured to terminate the polymerization reaction, and a mixture of hydrochloric acid and methanol was added to decompose the catalyst component.

The yield of polystyrene was 16.5 g. The polystyrene had a weight average molecular weight of 280,000 and a number average molecular weight of 57,000. The polystyrene was extracted with methyl ethyl ketone as a solvent for 4 hours by the use of a Soxlet extractor. The insoluble solids content was 97 percent by weight (wt %). This methyl ethyl ketone-insoluble polystyrene had a melting point of 260° C. and a specific gravity of 1.043.

In connection with the methyl ethyl ketone-insoluble polystyrene, a $^{13}$C-NMR spectrum (signal of C$_1$ carbon of the aromatic ring) is shown in FIG. 1 (indicated by the symbol (a)), a $^{13}$C-NMR spectrum (signal of methine methylene carbon) is shown in FIG. 2 (indicated by the symbol (a)), a $^1$H-NMR spectrum (proton nuclear magnetic resonance spectrum) is shown in FIG. 3, (indicated by the symbol (a)), an X-ray diffraction pattern is shown in FIG. 4 (indicated by the symbol (a)), and an infrared absorption spectrum is shown in FIG. 5 (indicated by the symbol (a)).

COMPARATIVE EXAMPLE 1

Styrene was radical-polymerized at 0° C. by the use of an organic peroxide to produce atactic polystyrene. This polystyrene was extracted with methyl ethyl ketone in the same manner as in Example 1 (2). It was found that the whole of the polystyrene was extracted. This polystyrene had a glass transition temperature of 100° C. and a specific gravity of 1.05.

Figure 1B:
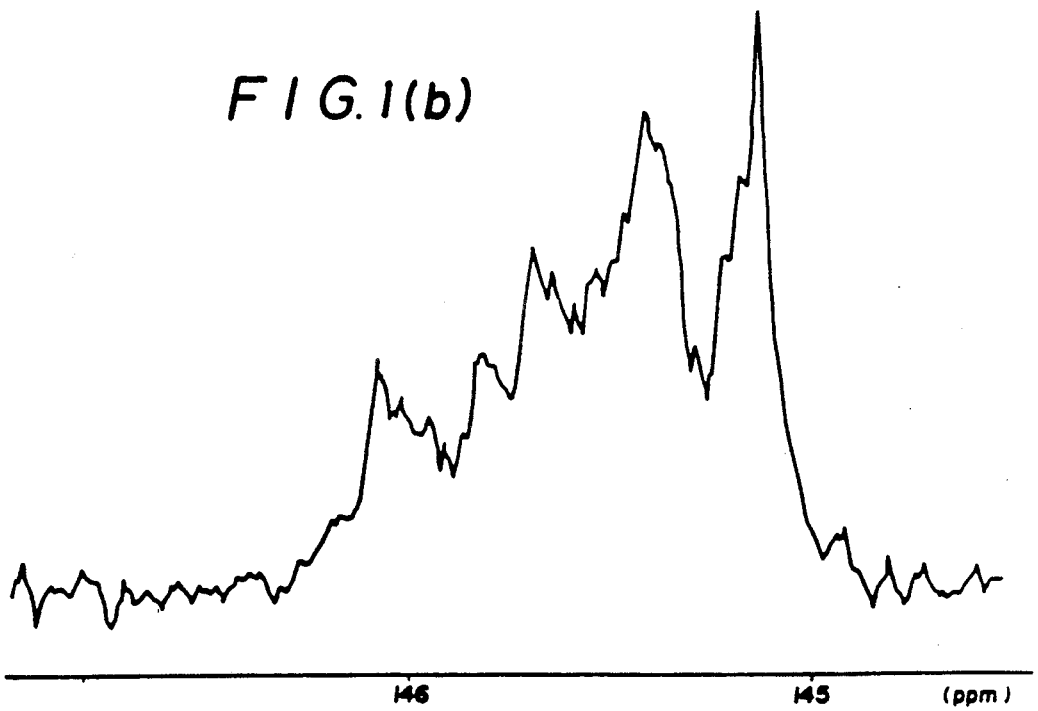
FIG. 1 shows $^{13}$C-NMR spectra (aromatic ring $C_1$ carbon signals) of styrene polymers produced in examples; (a) indicates polystyrene produced in Example 1, (b) indicates, atactic polystyrene produced in Comparative Example 1, (c) indicates isotactic polystyrene produced in Comparative Example 2, (d) indicates poly (p-methylstyrene) produced in Example 23, (e) indicates poly (m-methylstyrene) produced in Example 24, (f) indicates poly (p-terbutylstyrene) produced in Example 25, (g) indicates poly (p-chlorostyrene) produced in Example 26, (h) indicates atactic poly (p-chlorostyrene) produced commercially, (i) indicates poly (m-chlorostyrene) produced in Example 27, and (j) indicates poly (p-fluorostyrene) produced in Example 28.
Figure 2A:
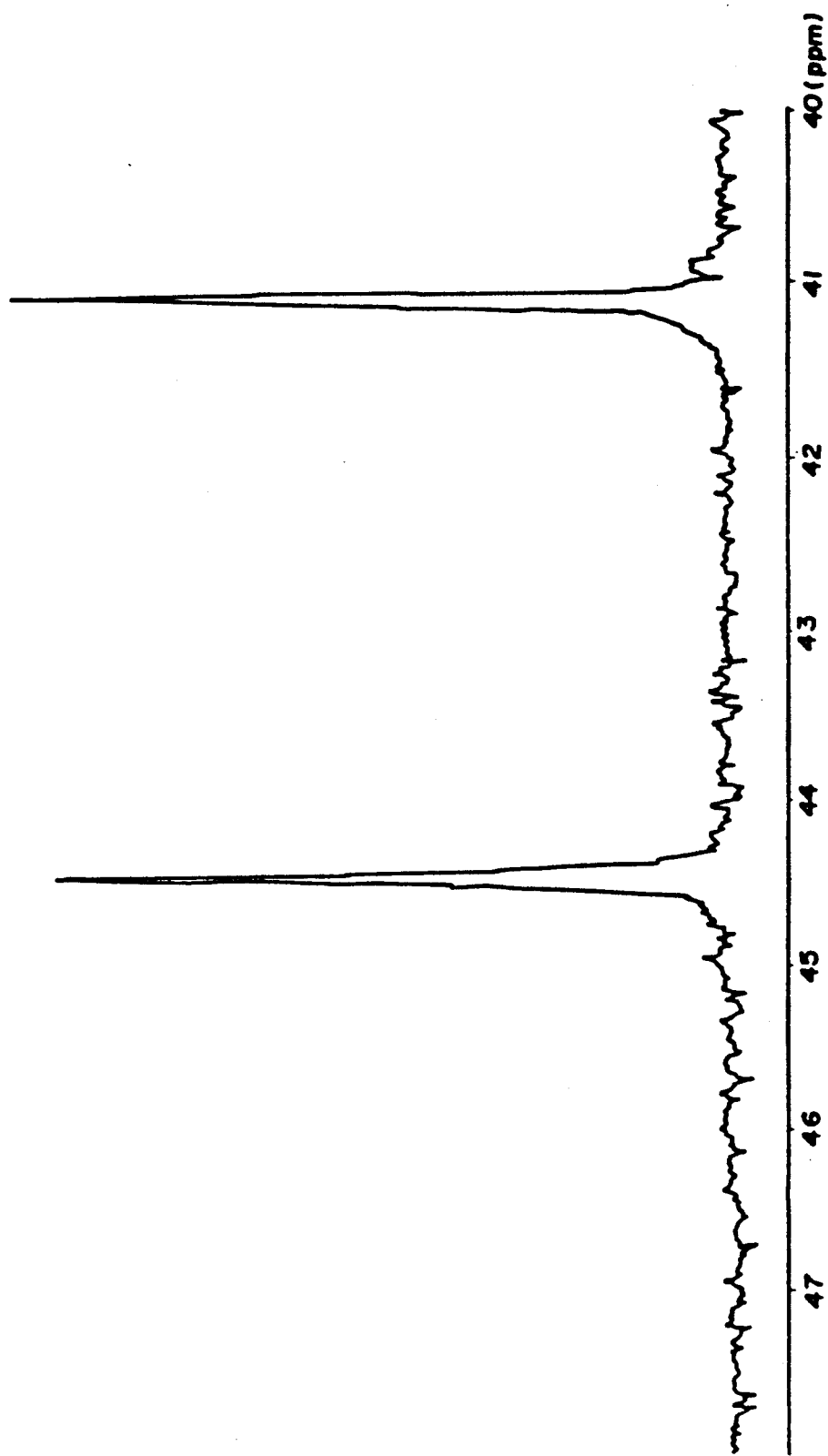
FIG. 2 shows $^{13}$C-NMR spectra (methine methylene carbon signals) of styrene polymers produced in example: (a) indicates polystyrene produced in Example 1, (b) indicates atactic polystyrene produced in Comparative Example 1, (c) indicates isotactic polystyrene produced in Comparative Example 2, and (d) indicates poly(p-methylstyrene) produced in Example 23.
Figure 2B:
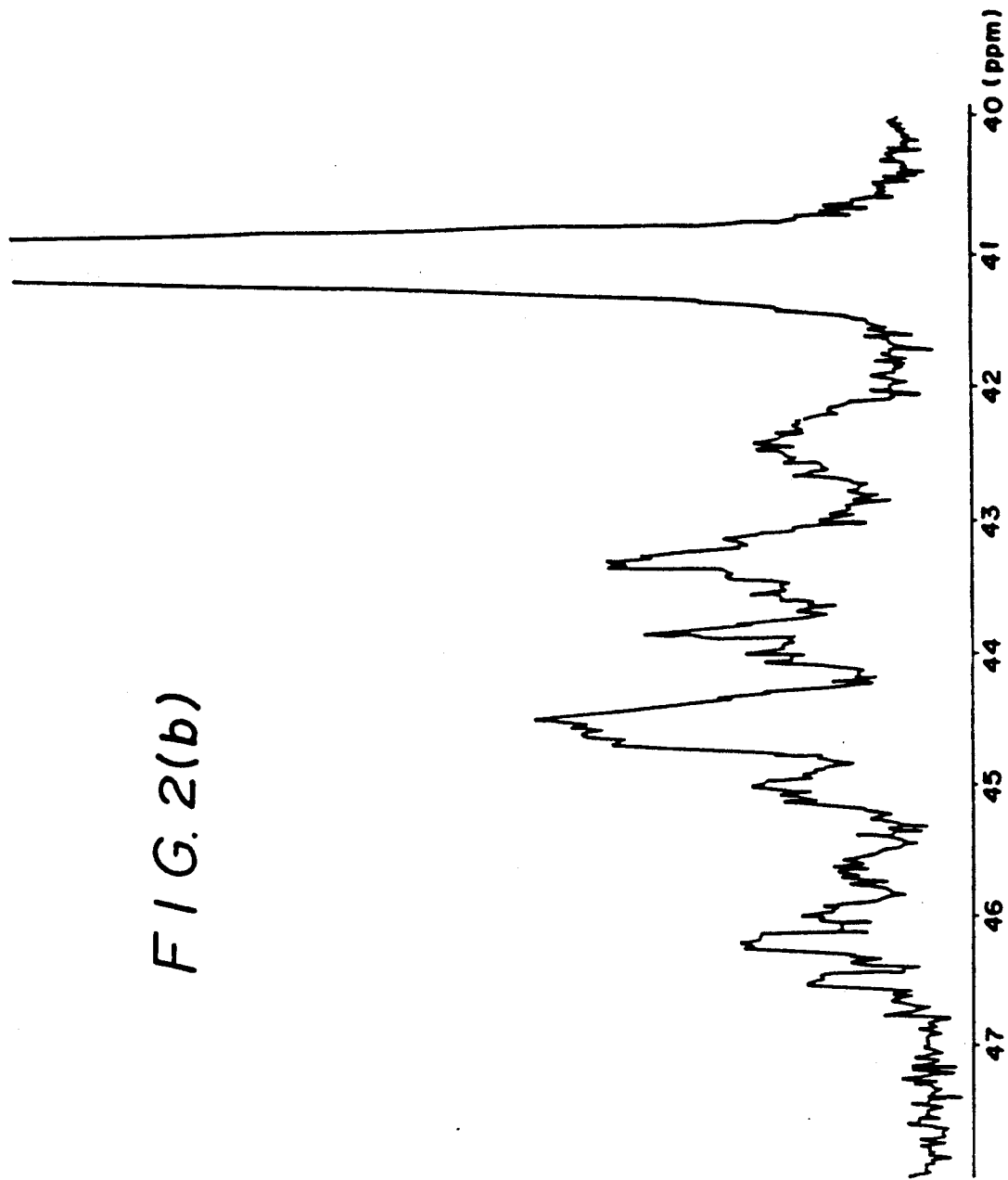
Figure 5A:
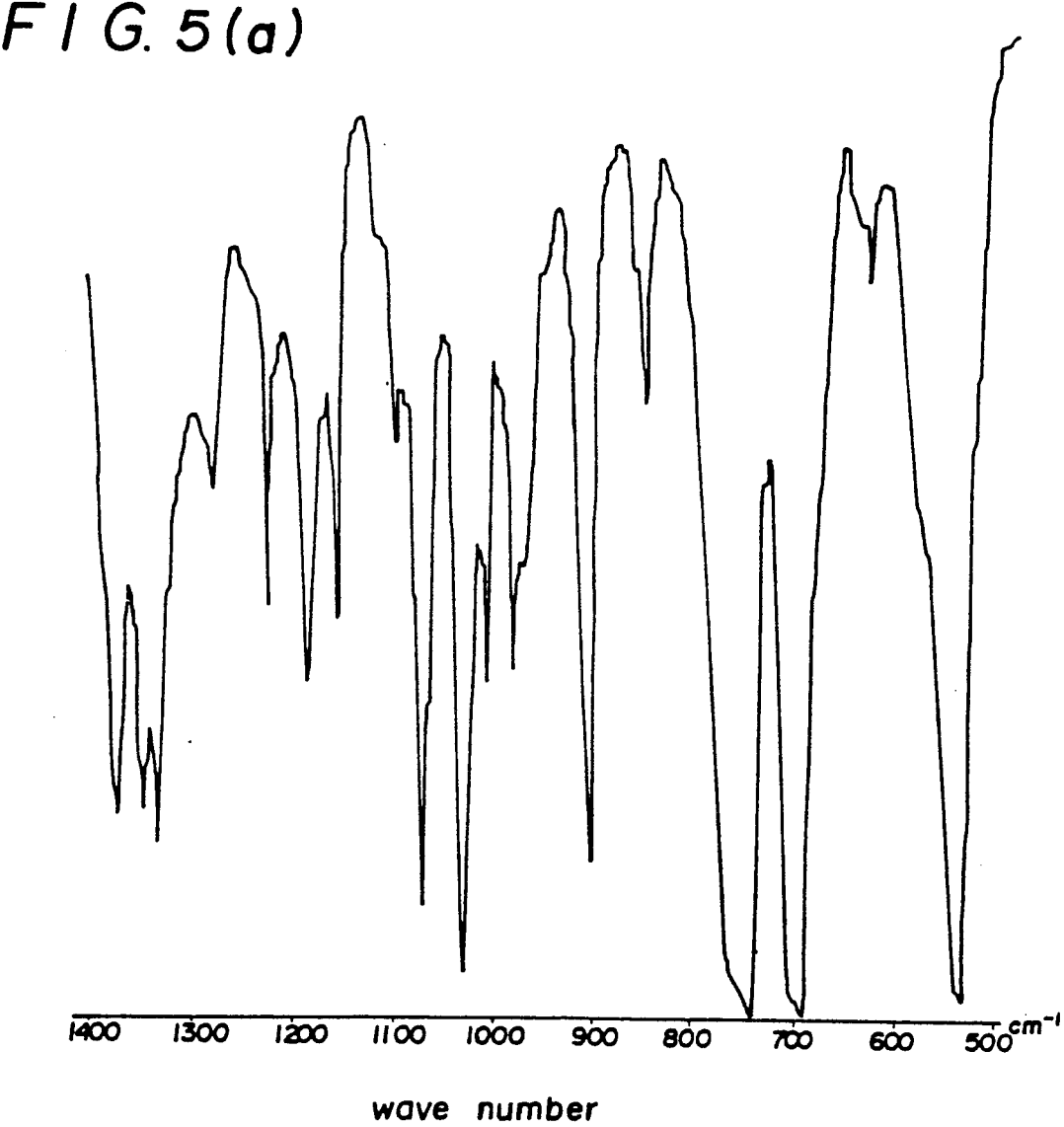
FIG. 5 shows infrared absorption spectra of styrene polymers produced in examples: (a) indicates polystyrene produced in Example 1, (b) indicates atactic polystyrene produced in Comparative Example 1, (c) indicates isotactic polystyrene produced in Comparative Example 2, and (d) indicates poly (p-methystyrene) produced in Example 23.
Figure 5B:
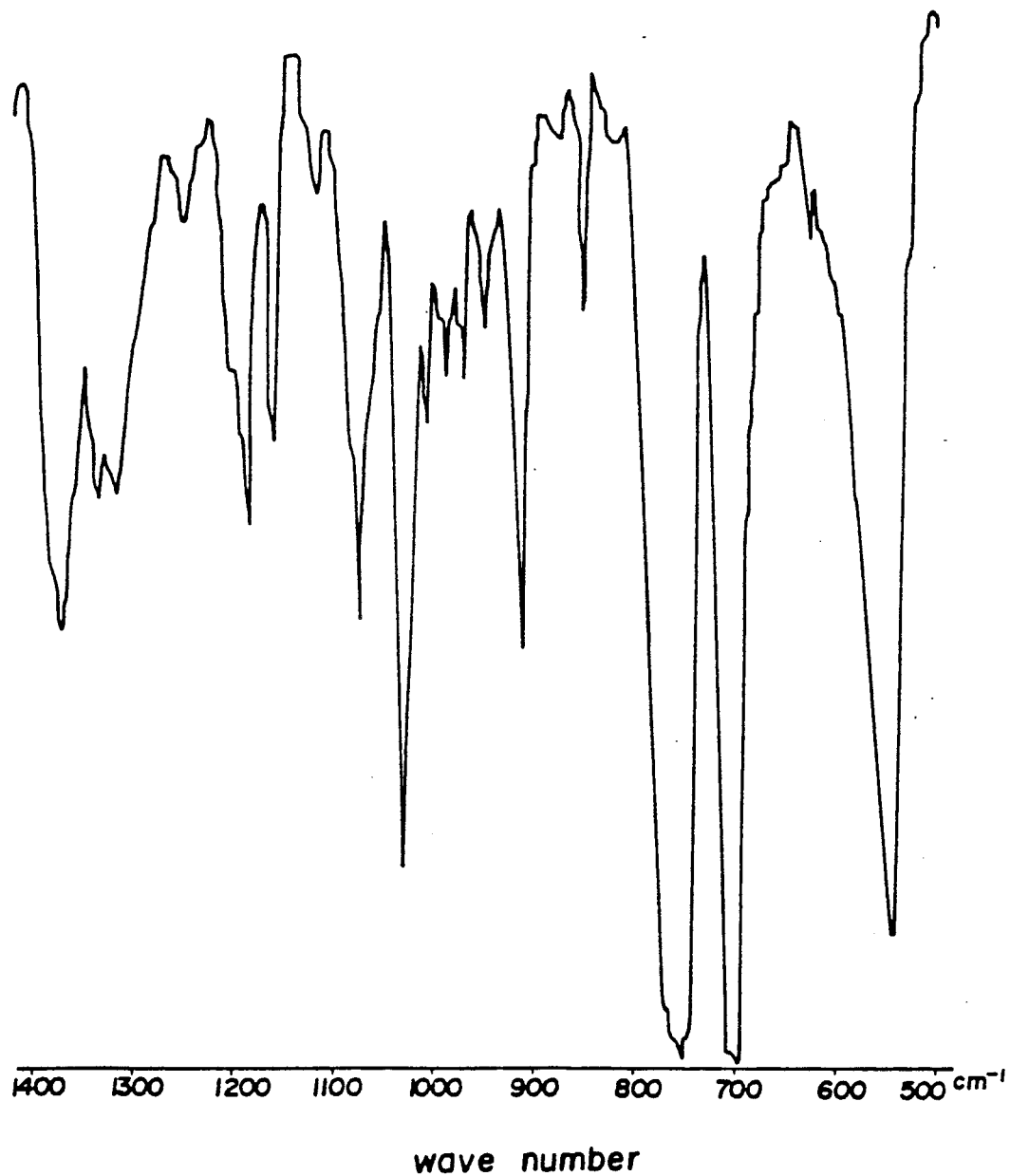

In connection with this atactic polystyrene, a $^{13}$C-NMR spectrum (signal of C$_1$ carbon of the aromatic ring) is shown in FIG. 1(b), a $^{13}$C-NMR spectrum (signal of methine methylene carbon) is shown in FIG. 2(b), and an infrared absorption spectrum is shown in FIG. 5(b).

COMPARATIVE EXAMPLE 2

A titanium catalyst component with a titanium compound deposited thereon was prepared by reacting 10.0 g of magnesium diethoxide and 50 ml of titanium tetrachloride. Then 1.0 mmol of the titanium catalyst component thus prepared and 10 mmol of triethylaluminum were combined together to prepare a catalyst. Using this catalyst, 100 ml of styrene was polymerized in heptane as a solvent at 70° C. for 2 hours to yield 48.7 g of isotactic polystyrene having a weight average molecular weight of 1,000,000. This polystyrene was extracted in the same manner as in Example 1 (2). The insoluble solids content was 96 wt %.

Figure 1C:
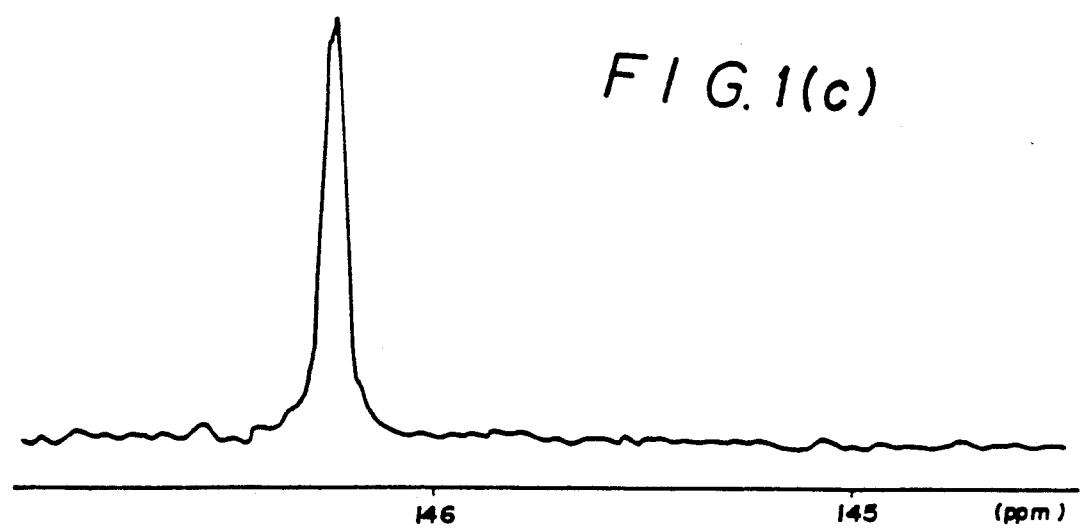
Figure 2C:
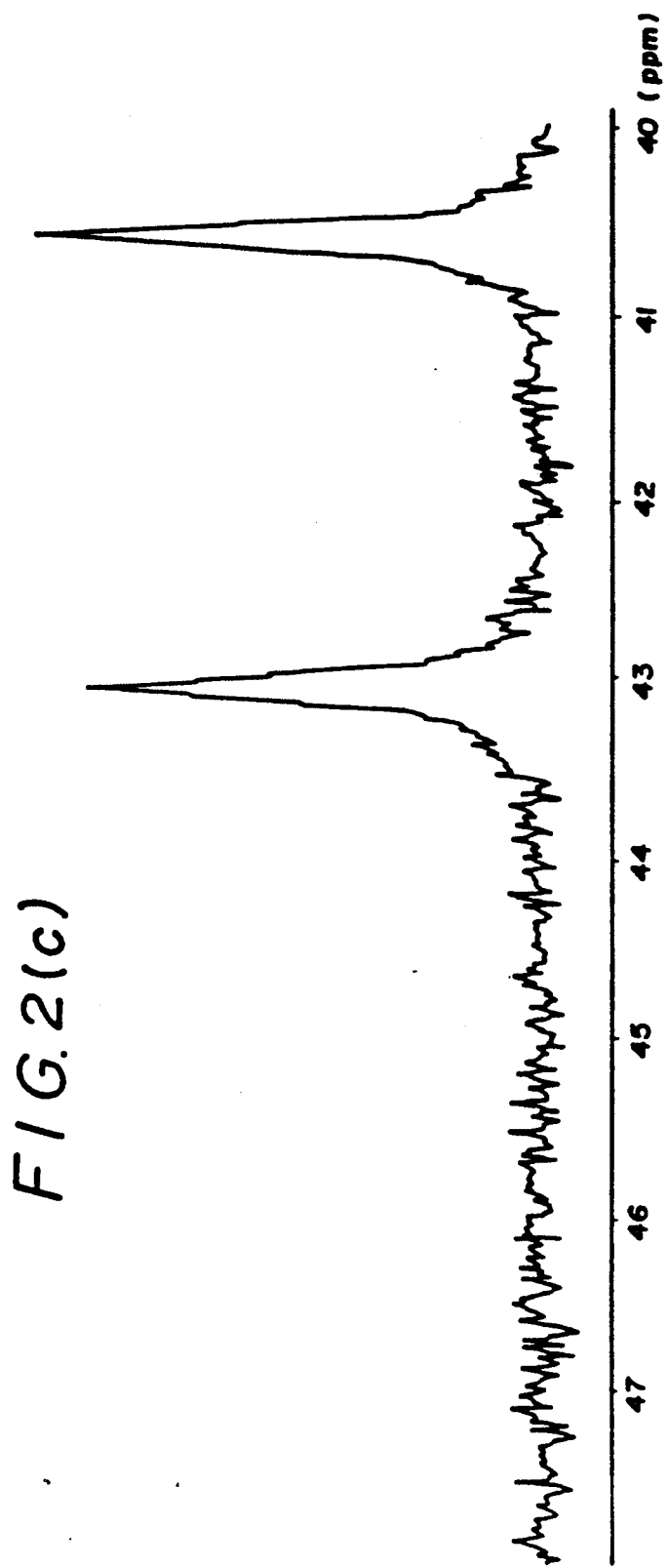
Figure 5C:
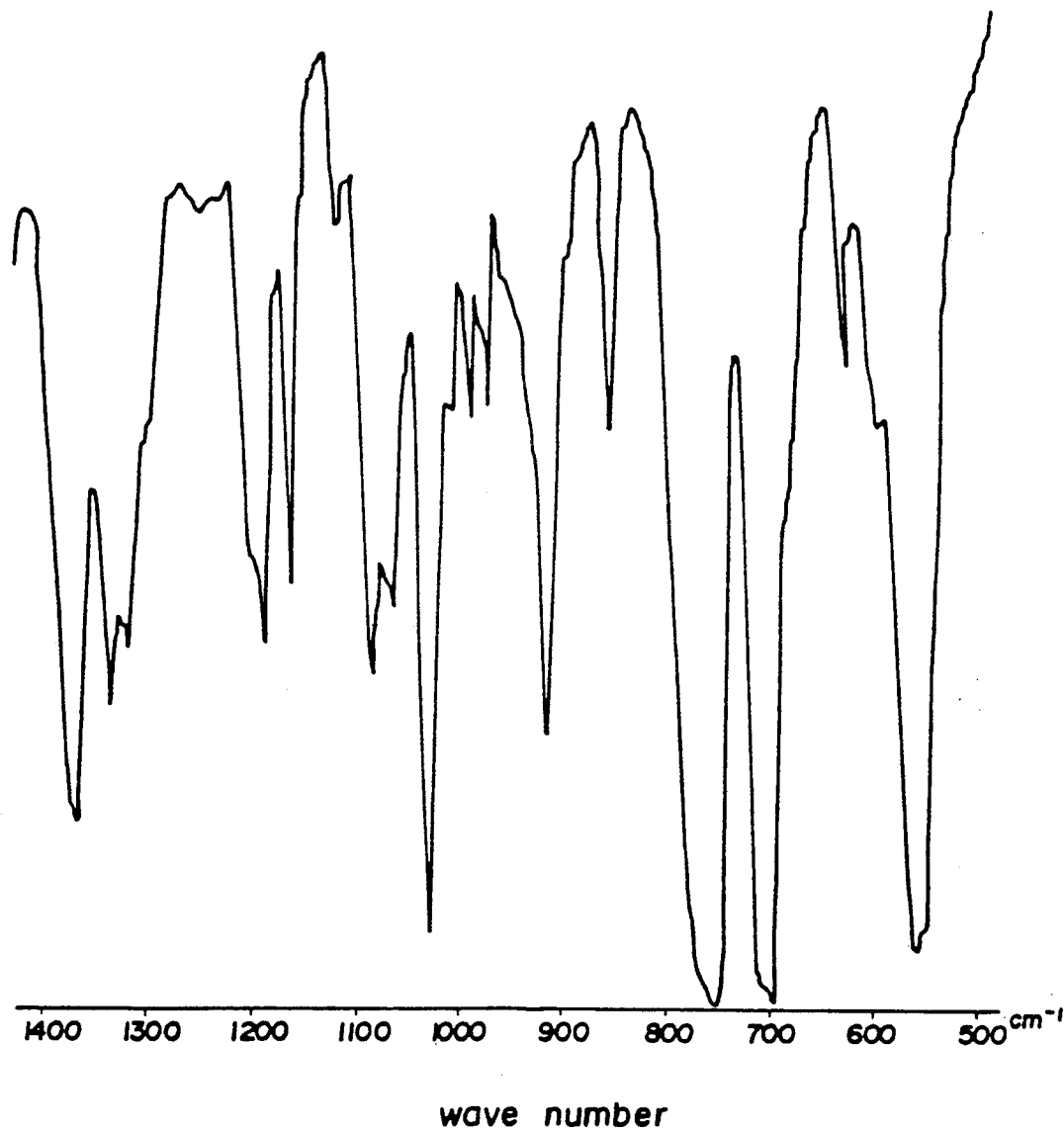

In connection with this methyl ethyl ketone-insoluble polystyrene, a $^{13}$C-NMR spectrum (signal of C$_1$ carbon of the aromatic ring) is shown in FIG. 1(c), a $^{13}$C-NMR (signal of methine methylene carbon) is shown in FIG. 2(c), a $^1$H-NMR spectrum is shown in FIG. 3(b), a X-ray diffraction pattern is shown in FIG. 4(b), and an infrared absorption spectrum is shown in FIG. 5(c).

Based on the analytical data of the polystyrene obtained in Example 1 (2) and the analytical data of the atactic polystyrene obtained in Comparative Example 1, and the analytical data of the isotactic polystyrene obtained in Comparative Example 2, it was confirmed that the polystyrene of Example 1 (2) had a syndiotactic structure.

(1) $^{13}$C-NMR data (i) Signal of C$_1$ carbon of the aromatic ring

It is well known that splitting of the aromatic ring C$_1$ carbon signal is ascribable to a polymer microstructure. The value found in the literature, and the values actually measured for the polystyrene of Example 1, atactic polystyrene of Comparative Example 1 and isotactic polystyrene of Comparative Example 2 (FIG. 1(a, (b), (c)) are tabulated in Table 1.

It can be seen from the results of Table 1 that the polystyrene of Example 1 has a syndiotactic structure, and the syndiotacticity in terms of the racemic pentad as determined from the peak area of FIG. 1(a) is not less than 96%; that is, the polystyrene of Example 1 had a tacticity of nearly 100%.

TABLE 1

| Ascription*1 | Atactic Polystyrene | Value of the Literature*2 | Polystyrene of Example 1 | Isotactic Polystyrene |
|---|---|---|---|---|
| mmmm | — | — | — | 146.44 |
| mmmr | 146.27 | 146.23 | — | — |
| rmmr | 146.00 | 146.03 | — | — |
| mmrm | 145.85 | 145.80 | — | — |
| mmrr | — | — | — | — |
| rmrm | 145.60 | 145.63 | — | — |
| rrmr | — | — | — | — |
| rr | 145.32 | 145.32 | 145.35 | — |

*1 m represents a structural unit of

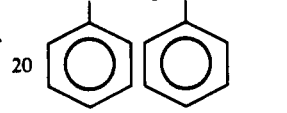

and r represents a structural unit of

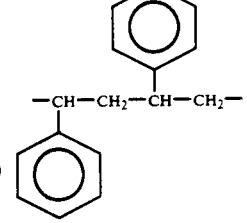

*2 Value shown in H. Sato & Y. Tanaka, J. Polym. Sci., Polym. Phys. Ed., 21, 1667–1674 (1983).

(ii) Methine methylene carbon signal

It is also well known that splitting of the methine methylene carbon signal is ascribable to a polymer microstructure. In the case of polystyrene, there are many literatures reporting the ascription of the splitting. The value found in the literature, and the values actually measured for the polystyrene of Example 1 atactic polystyrene of Comparative Example 1 and isotactic polystyrene of Comparative Example 2 (FIG. 2(a), (b), (c)) are tabulated in Table 2.

TABLE 2

| Ascription*1 | Atactic Polystyrene | Value of the Literature*2 | Polystyrene of Example 1 | Isotactic Polystyrene |
|---|---|---|---|---|
| mrmm | 46.73 | 46.73 | — | — |
| mrmrr | 46.65 | 46.44 | — | — |
| rrmrr | 46.19 | 46.22 | — | — |
| mrrrm | 45.79 | 45.61 | — | — |
| rrrrm | 45.20 | 45.22 | — | — |
| rrrrr | 44.70 | 44.95 | 44.74 | — |
| mmr | — | 44.79 | — | — |
| mrrmr | 44.05 | 44.05 | — | — |
| mrrmm | — | — | — | — |
| rrrmr | 43.53 | 43.59 | — | — |
| rrrmm | — | — | — | — |
| mmm | — | — | — | 43.34 |
| rmrmr | — | 42.70 | — | — |
| mmrmr | — | 42.66 | — | — |
| mmrmm | — | 42.55 | — | — |

*1, *2: Same as in Table 1.

The figures in the table are expressed in the unit of ppm (tetramethylsilane (TMS) standards). It can be seen from the results of Table 2 that the polystyrene of Example 1 is syndiotactic polystyrene, and its syndiotacticity is nearly 100% because the signal of methylene carbon exhibits a single peak.

(2) $^1$H-NMR data

It is well known as described in S. Brownstein, S. Bywater & D. T. Worsford, *J. Phys. Chem.*, 66, 2067 (1962) that the $^1$H-NMR spectrum provides an information concerning the microstructure like the $^{13}$C-NMR spectrum.

Figure 3A:
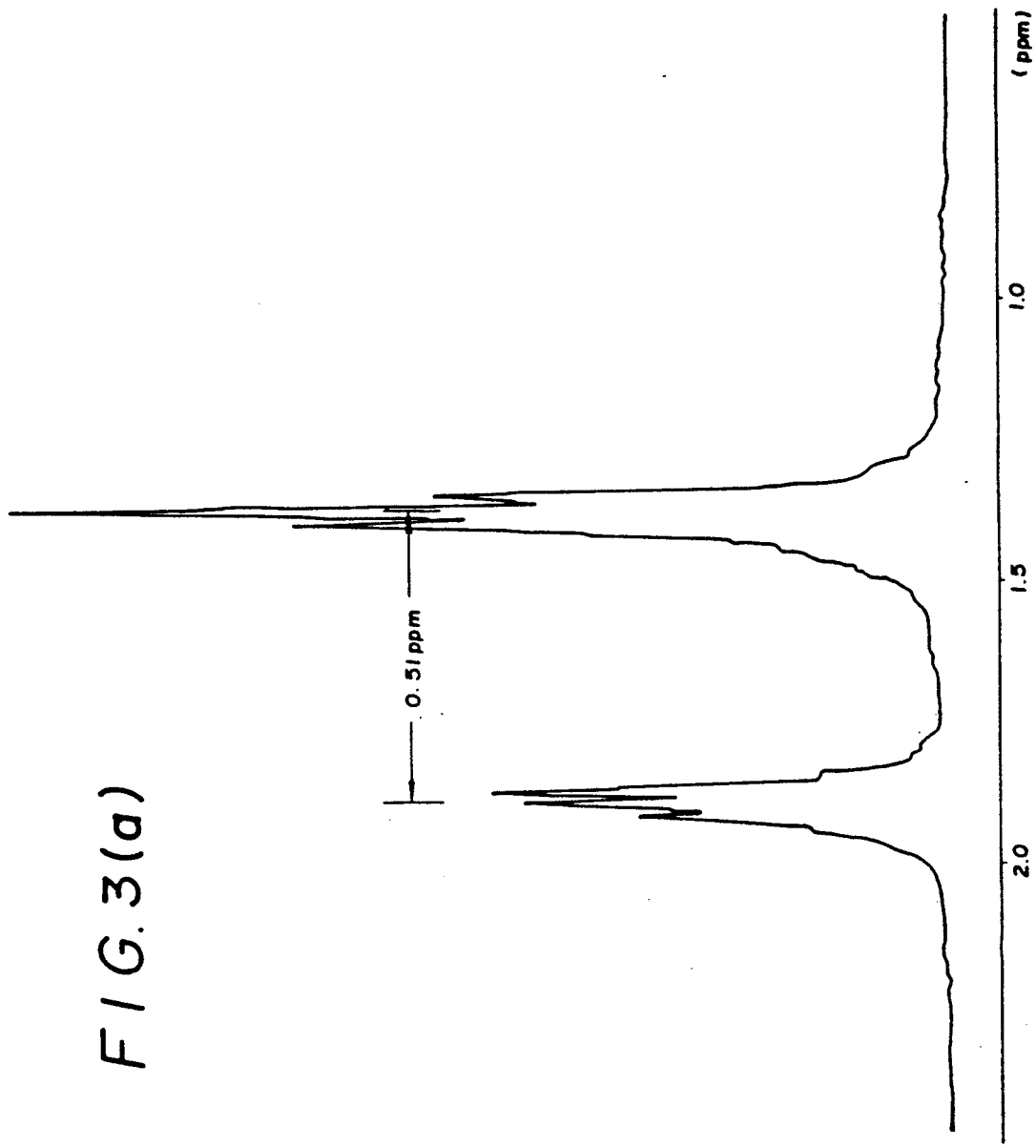
FIG. 3 shows $^1$H-NMR spectra of styrene polymers produced in examples: (a) indicates polystyrene produced in Example 1, (b) indicates isotactic polystyrene produced in Comparative Example 2, and (c) indicates poly (p-methyl-styrene) produced in Example 23.

The methine proton signal of the polystyrene of Example 1 shows that when FIG. 3(a) and (b) are compared, the methine proton of the polystyrene of Example 1 appears a higher magnetic field as compared with that of the isotactic polystyrene of Comparative Example 2; that is, the polystyrene of Example 1 is apparently different from the isotactic polystyrene of Comparative Example 2. Furthermore, the spectrum of the polystyrene of Example 1 shows considerable fine structure. This fact also confirms that the polystyrene of Example 1 is different from at actic polystyrene because the spectrum of the atactic polystyrene does not show a fine structure (see F. A. Bovey & F. P. Hood, III, *J. Chem. Phys.* 38, 1026 (1963). Moreover, there were observed only one kind of methine proton and of methylene proton in the molecular chain. Based the above data, it was judged that the polystyrene of Example 1 has a nearly 100% syndiotactic structure.

Based on the results of (1) and (2) above, it was confirmed that the polystyrene of Example 1 was a polymer having a steric configuration comprising not less than 96% in terms of the racemic pentad; that is, a polymer comprising nearly 100% of a syndiotactic structure. (3) X-ray diffraction pattern The polystyrene of Example 1 was crystalline. The X-ray diffraction pattern (FIG. 4(a)) of the crystalline polystyrene is quite different from that of the isotactic polystyrene (FIG. 4(b)) (G. Natta & P. Corradini, *Nuovo Cimento*, 15, Suppl. 1, 40 (1960)). Thus it can be seen that the polystyrene of Example 1 is different in crystalline structure from isotactic polystyrene.

From the results of FIG. 4(a), it was found that the identity period of the polystyrene of Example 1 was 5.04 Å. This identity period suggests that the polymer chain is in a zig-zag structure and phenyl rings are disposed alternately. This confirms that the polystyrene of Example 1 has a syndiotactic structure.

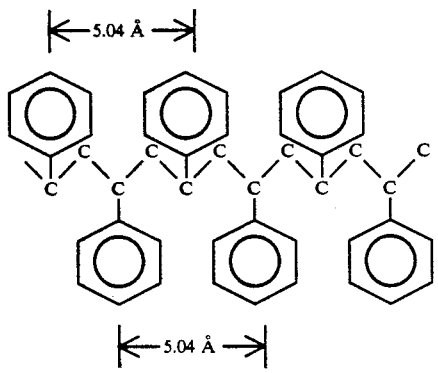

(4) Infrared absorption spectrum

Peaks of the spectra shown in FIG. 5(a), (b), (c) are shown in Table 3.

TABLE 3

| | Wave Number (cm$^{-1}$) | | | | |
|---|---|---|---|---|---|
| | 1364 | 1312 | 1297 | 1185 | 583 |
| Polystyrene of Example 1 | x | x | x | o | x |
| Isotactic Polystyrene | o | o | o | o | o |
| Atactic Polystyrene | o | o | o | o | x | o: Absorption
x: No absorption

The polystyrene of Examples 1 has a characteristic absorption peak at 1220 cm$^{-1}$ which cannot be found in polystyrene having an isotactic or atactic structure.

(5) Melting point

The melting point of the polystyrene of Example 1 was 260°–270° C., which is much higher than that (220°–230° C.) of isotactic polystyrene.

(6) Tacticity of extract after extraction with methyl ethyl ketone

In determining the stereoregularity of polystyrene, the following method is generally employed.

Polystyrene is extracted with methyl ethyl ketone as a solvent by the use of a Soxlet extractor. If the polystyrene is insoluble, it is determined to be isotactic polystyrene, and if soluble, it is determined to be atactic polystyrene (T. Nakada, Y. Kinosita, T. Ohtu & M. Imoto, *Kougyo Kagaku*, 68, 858–864 (1965)).

A methyl ethyl ketone-insoluble portion of the polystyrene of Example 1 had a syndiotactic structure, and a methyl ethyl ketone-soluble portion also has a syndiotacticity of not less than 82%.

Styrene (100 ml) was polymerized at 50° C. for 8 hours in the presence of a catalyst comprising 1 mmol of titanium tetrachloride and 40 mmol of methylaluminoxane. Thereafter, the same procedure as in Example 1 (2) was repeated to form 0.1 g of polystyrene.

For the polystyrene thus obtained, the syndiotacticity was such that the racemic pentad of $^{13}$C-NMR was not less than 36%, the weight average molecular weight (Mw) was 544,000, and the number average molecular weight (Wn) was 223,000.

In the extraction of the polystyrene with methyl ethyl ketone, 79 wt % of the polystyrene was extracted. For the extraction residue, the syndiotacticity was such that the racemic pentad of $^{13}$C-NMR was 86%, the weight average molecular weight (Mw) was 678,000 and the number average molecular weight (Mn) was 272,000. The syndiotacticity of the above extract was such that the racemic pentad of $^{13}$C-NMR was 23%. This is similar to a tacticity of the usual radical polymerized polystyrene.

EXAMPLE 3

The procedure of Example 2 was repeated wherein the amount of titanium tetrachloride as a catalyst component was changed to 0.05 mmol, the amount of styrene used was changed to 180 ml, and the polymerization time was changed to 2 hours. In this was, 6.7 g of polystyrene was produced.

In the extraction of the polystyrene thus obtained with methyl ethyl ketone, 8 wt % of the polystyrene was extracted. For the extraction residue; that is polystyrene remaining after the extraction, the syndiotacticity was not less than 99%, the weight average molecular weight (Mw) was 348,000 and the number average molecular weight (Mn) was 156,000.

EXAMPLE 4

The procedure of Example 1 was repeated wherein 1 mmol of isopropoxytitanium trichloride was used in place of titanium tetrachloride as a catalyst component and the polymerization time was changed to 2 hours. In this way, 0.4 g of polystyrene was produced. For the polystyrene thus produced, the syndiotacticity was such that the racemic pentad of $^{13}$C-NMR was 96%, the weight average molecular weight (Mw) was 92,000 and the number average molecular weight (Mn) was 31,000.

In the extraction of the above polystyrene with methyl ethyl ketone, 58 wt % of the polystyrene was extracted. For the extraction residue; that is, polystyrene remaining after the extraction, the syndiotacticity was such that the racemic pentad of $^{13}$C-NMR was 96%, the weight average molecular weight (Mw) was 100,000 and the number average molecular weight (Mn) was 36,000. The syndiotacticity of the extract was such that the racemic pentad was 23%.

EXAMPLE 5

Polystyrene was produced in the same manner as in Example 2 except that a catalyst comprising 0.02 mmol of ethoxytitanium trichloride and 10 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 6

Polystyrene was produced in the same manner as in Example 2 except that a catalyst comprising 0.2 mmol (calculated as titanium tetrachloride) of magnesium diethoxide with titanium tetrachloride deposited thereon in an amount of 146 mg/g carrier and 10 mmol of methylaluminoxane was used and polymerization was performed under the conditions shown in Table 4. The polystyrene thus produced was extracted with methyl ethyl ketone. Properties of the polystyrene are shown in Table 4.

EXAMPLE 7

Polystyrene was produced in the same manner as in Example 2 except that a catalyst comprising 0.2 mmol (calculated as tetraethoxytitanium) of magnesium chloride with titanium tetraethoxide deposited thereon in an amount of 80 mg/g carrier and 10 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 8

Polystyrene was produced in the same manner as in Example 2 except that a catalyst comprising 0.02 mmol (calculated as titanium) of magnesium chloride with an excess of titanium tetrachloride deposited thereon and 10 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 9

Polystyrene was produced in the same manner as in Example 2 except that a catalyst comprising 0.02 mmol (calculated as titanium) of magnesium chloride with titanium tetrachloride and ethyl benzoate deposited thereon and 10 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 10

Polystyrene was produced in the same manner as in Example 2 except that a catalyst comprising 0.02 mmol of titanium trichloride and 20 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 11

Polystyrene was produced in the same manner as in Example 2 except that a catalyst comprising 1 mmol of titanium tetrachloride, 1 mmol of vanadyl tributoxide $(VO(O.C_4H_9)_3)$ and 40 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLES 12 AND 13

Polystyrene was produced in the same manner as in Example 2 except that a catalyst comprising 1 mmol of isopropoxytitanium chloride, 1 mmol of vanadyl tributoxide and 40 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLES 14 TO 16

Polystyrene was produced in the same manner as in Example 2 except that a catalyst comprising 0.05 mmol of titanium tetraethoxide and 5 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 17

Polystyrene was produced in the same manner as in Example 2 except that a catalyst comprising 0.05 mmol of titanium tetraethoxide and 10 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLES 18 TO 20

Polystyrene was produced in the same manner as in Example 2 except that a catalyst comprising 0.05 mmol of titanium tetraethoxide and 25 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 21

Polystyrene was produced in the same manner as in Example 2 except that a catalyst comprising 1 mmol of titanium tetraisoproxide, 1 mmol of vanadyl tributoxide and 40 mmol of methylaluminoxane was used and polymerization was performed under the conditions shown in Table 4. The polystyrene thus produced was extracted with methyl ethyl ketone in the same manner as in Example 2. Properties of the polystyrene are shown in Table 4.

EXAMPLE 22

A styrene-p-methylkstyrene copolymer was produced in the same manner as in Example 2 except that a catalyst comprising 0.02 mmol of cyclopentadienyltitanium trichloride and 10 mmol of methylaluminoxane was used, and a mixture of styrene and p-methylstyrene was used as the starting material and polymerized under the conditions shown in Table 4. The copolymer thus produced was extracted with methyl ethyl ketone in the same manner as in Example 2. Properties of the copolymer are shown in Table 4.

EXAMPLE 23

Poly)p-methylstyrene) was produced in the same manner as in Example 2 except that a catalyst comprising 0.025 mmol of cyclopentadienyltitanium trichloride and 40 mmol of methylaluminoxane was used, and p-methylstyrene was used as the starting material and polymerized under the conditions shown in Table 4. The poly(p-methylstyrene) thus produced was extracted with methyl ethyl ketone in the same manner as in Example 2. Properties of the poly(p-methylstyrene) are shown in Table 4.

Figure 1D:
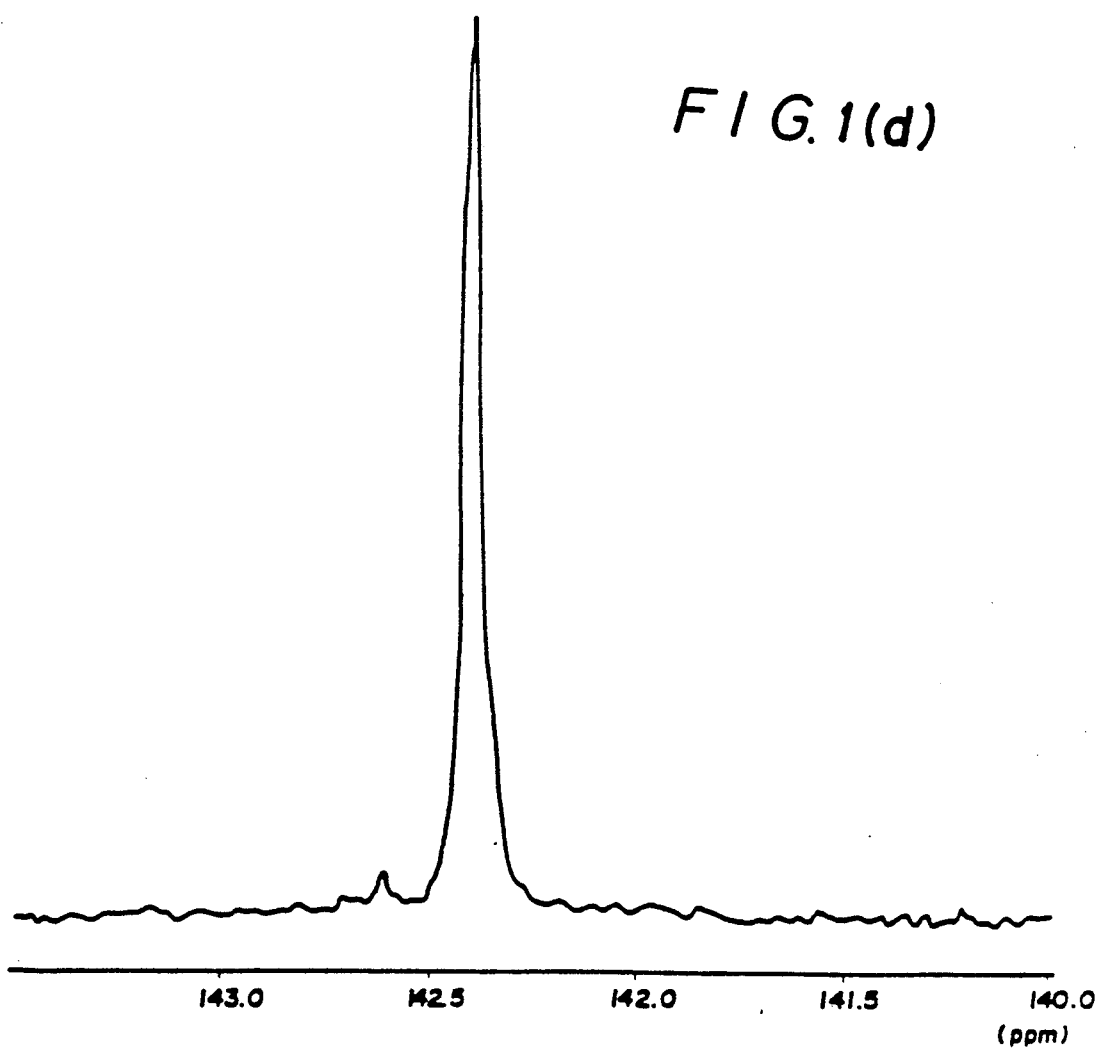
Figure 2D:
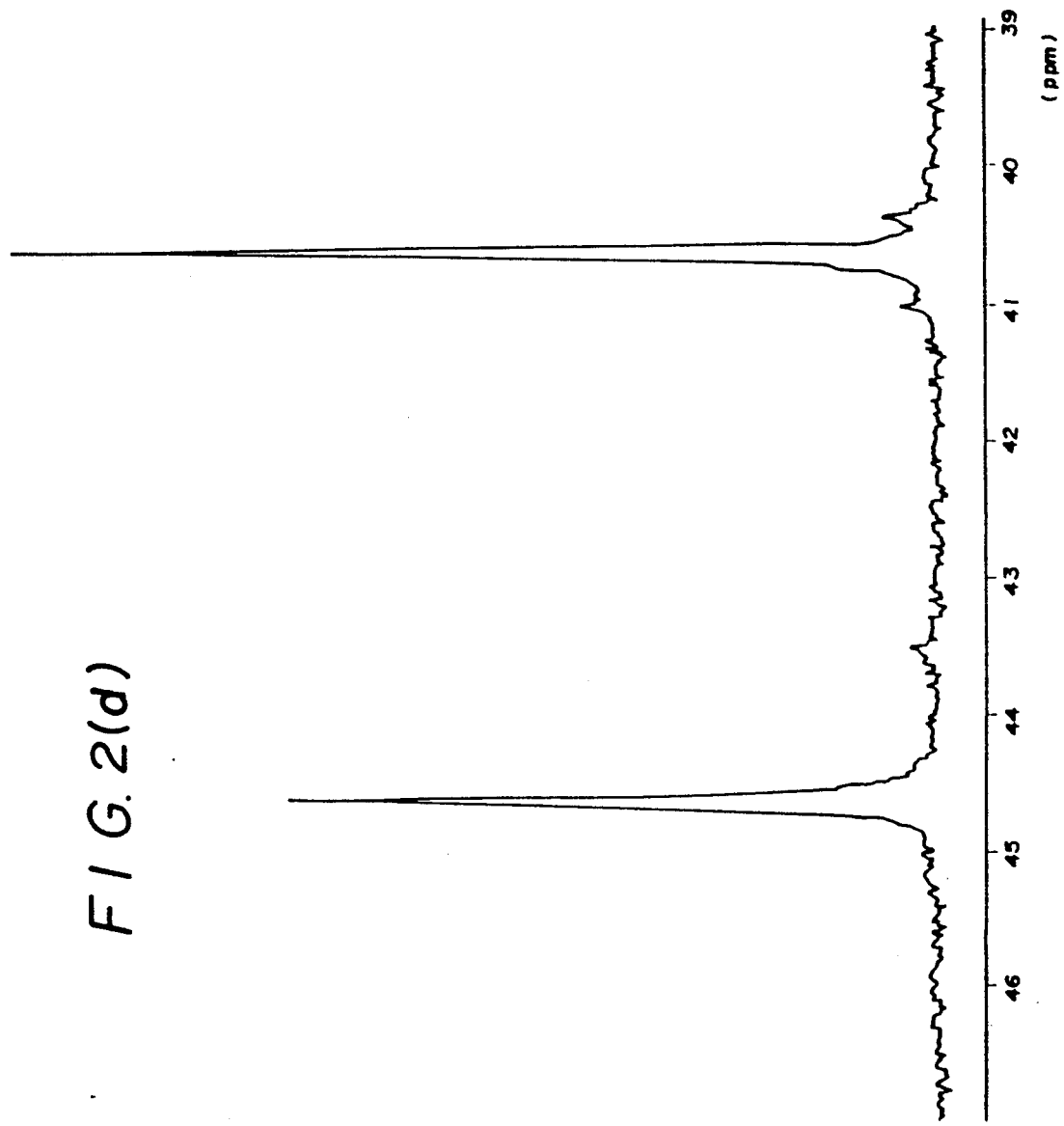
Figure 3C:
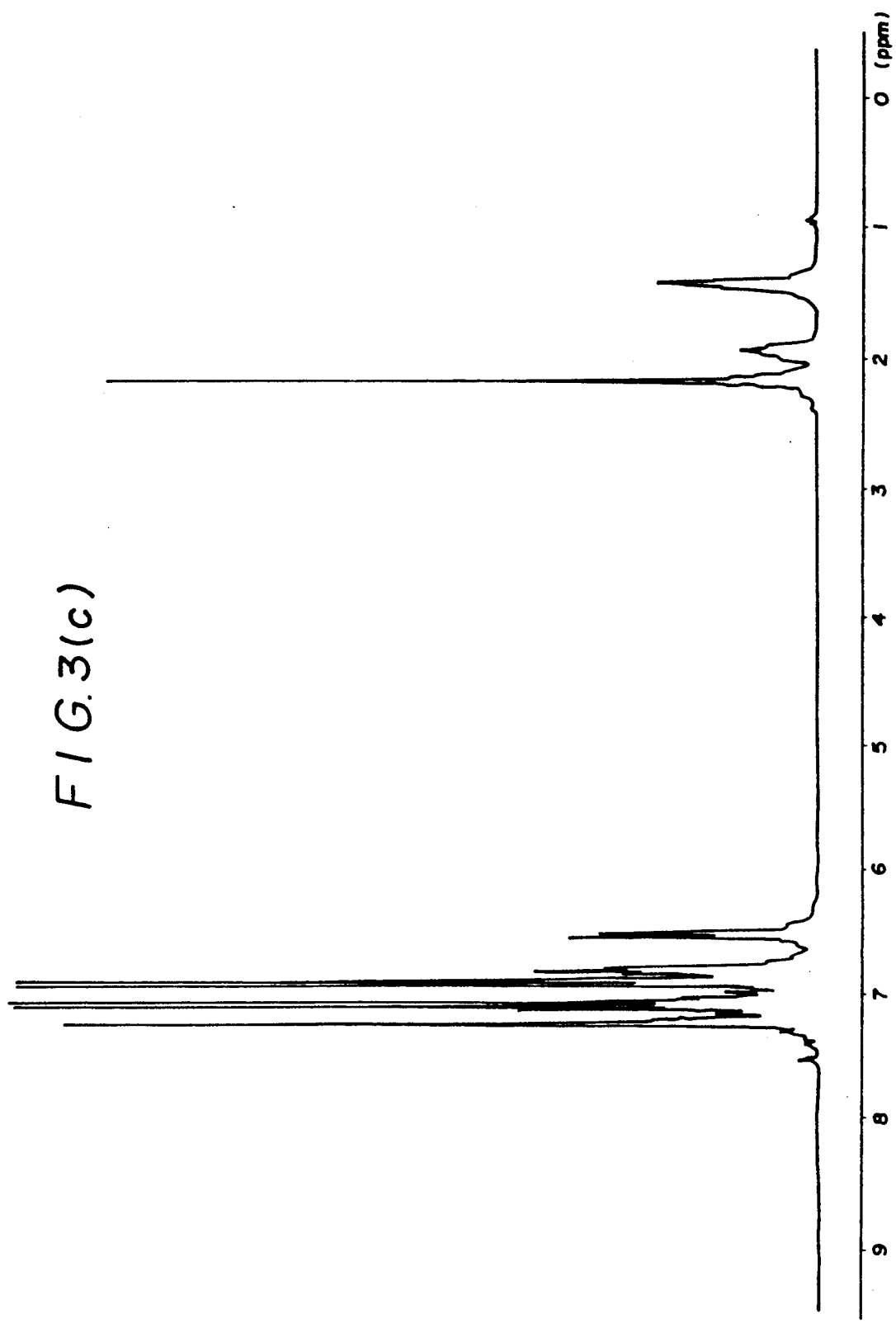
Figure 5D:
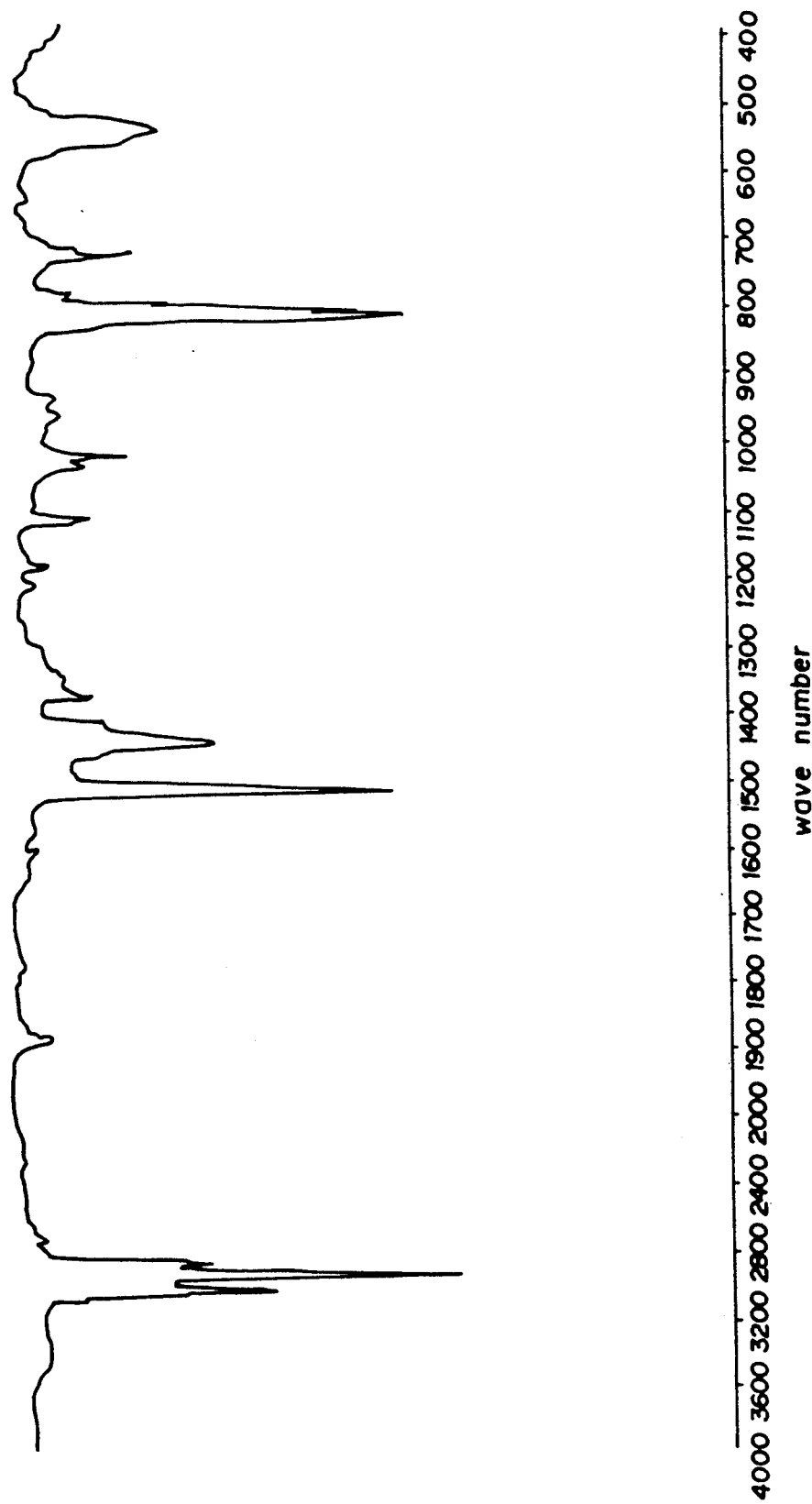

A $^{13}$C-NMR spectrum (aromatic carbon $C_1$ carbon signal) of the poly(p-methylstyrene) is shown in FIG. 1(d); a $^{13}$C-NMR spectrum (methine methylene carbon signal) is shown in FIG. 2(d); a $^1$H-NMR spectrum is shown in FIG. 3(c); an X-ray diffraction pattern is shown in FIG. 4(c); and an infrared absorption spectrum is shown in FIG. 5(d).

EXAMPLE 24

Poly(m-methylstyrene) was produced in the same manner as in Example 2 except that a catalyst comprising 0.05 mmol of cyclopentadienyltitanium trichloride and 30 mmol of methylaluminoxane was used, and m-methylstyrene was used as the starting material and polymerized under the conditions shown in Table 4. The poly(m-methylstyrene) thus produced was extracted with methyl ethyl ketone in the same manner as in Example 2. Properties of the poly(m-methylstyrene) are shown in Table 4.

Figure 1E:
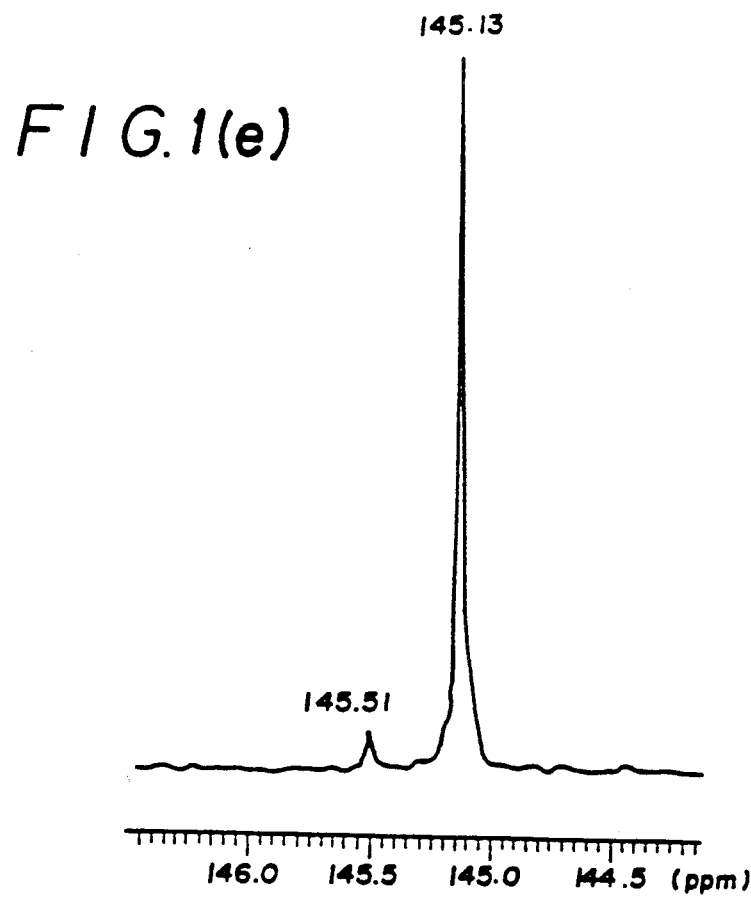

A $^{13}$C-NMR (aromatic ring $C_1$ carbon signal) of the poly(m-methylstyrene) is shown in FIG. 1(e).

EXAMPLE 25

Poly(p-tert-butylstyrene) was produced in the same manner as in Example 2 except that a catalyst comprising 0.05 mmol of cyclopentadienyltitanium trichloride and 30 mmol of methylaluminoxane was used, and p-tert-butylstyrene was used as the starting material and polymerized under the conditions shown in Table 4. The poly(p-tert-butylstyrene) thus produced was extracted with methyl ethyl ketone in the same manner as in Example 2. Properties of the poly(p-tert-butylstyrene) are shown in Table 4.

Figure 1F:
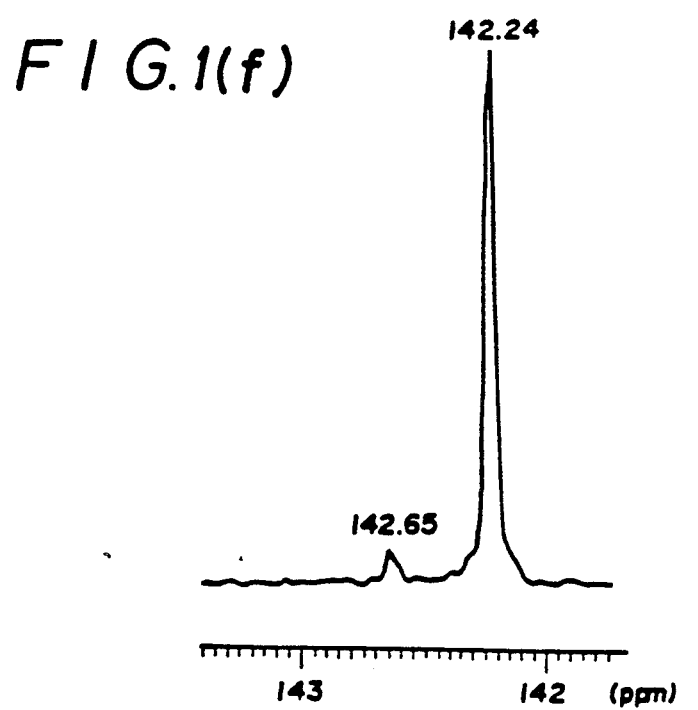

A $^{13}$C-NMR spectrum (aromatic ring $C_1$ carbon signal) of the poly(p-tert-butylstyrene) is shown in FIG. 1(f).

EXAMPLE 26

Poly(p-chlorostyrene) was produced in the same manner as in Example 2 except that a catalyst comprising 0.05 mmol of cyclopentadienyltitanium trichloride and 40 mmol of methylaluminoxane was used, p-chlorostyrene was used as the starting material and polymerized under the conditions shown in Table 4. The poly(p-chlorostyrene) thus produced was extracted with methyl ethyl ketone in the same manner as in Example 2. Properties of the poly(p-chlorostyrene) are shown in Table 4.

Figure 1G:
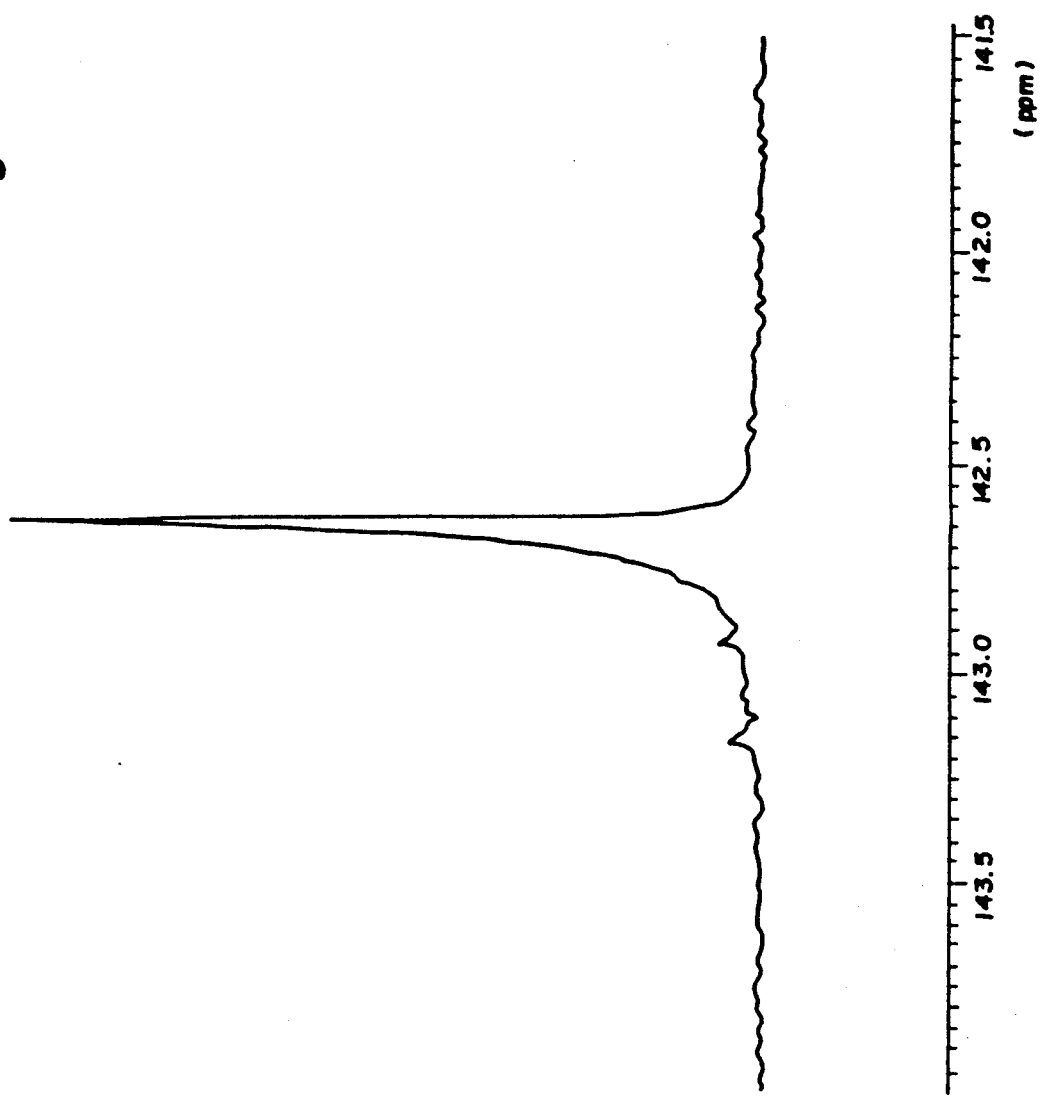

A $^{13}$C-NMR spectrum (aromatic ring $C_1$ carbon signal) of the poly(p-chlorostyrene) is shown in FIG. 1(g). For comparison, a $^{13}$C-NMR spectrum (aromatic ring $C_1$ carbon signal of atactic poly(p-chlorostyrene) is shown in FIG. 1(h).

EXAMPLE 27

Figure 1I:
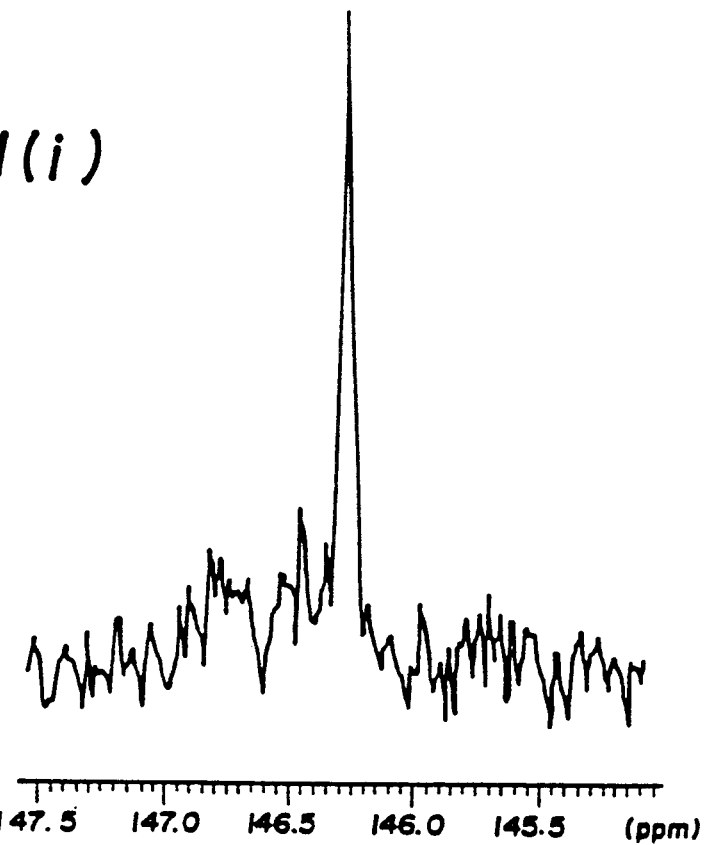
Figure 1J:
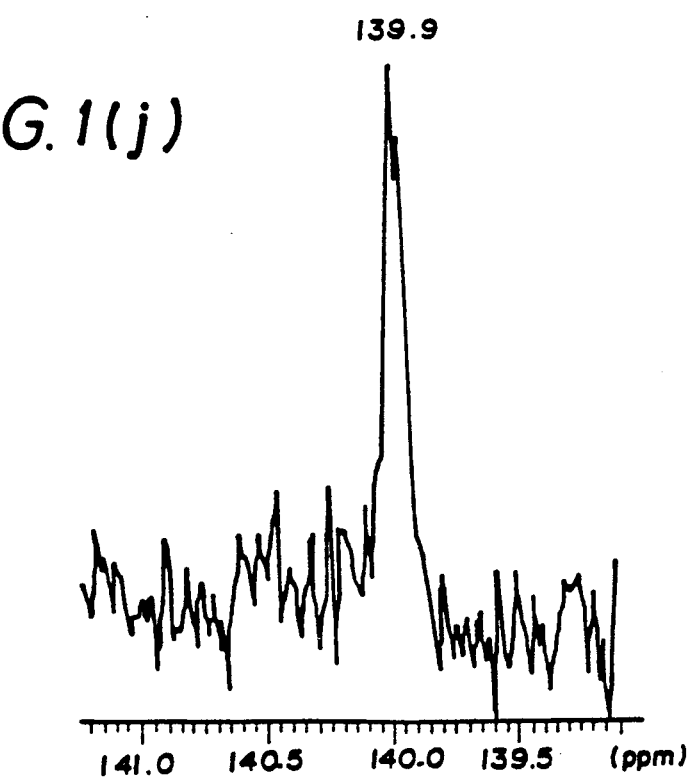

Poly(m-chlorostyrene) was produced in the same manner as in Example 2 except that a catalyst comprising 0.05 mmol of titanium tetraethoxide and 5 mmol of methylaluminoxane was used, and m-chlorostyrene was used as the starting material and polymerized under the conditions shown in Table 4. The poly(m-chlorostyrene) thus produced was extracted with methyl ethyl ketone in the same manner as in Example 2. Properties of the poly(m-chlorostyrene) are shown in Table 4. A $^{13}$C-NMR spectrum (aromatic ring $C_1$ carbon signal) of the poly(m-chlorostyrene) is shown in FIG. 1(i).

EXAMPLE 28

Poly(p-fluorostyrene) was produced in the same manner as in Example 2 except that a catalyst comprising 0.05 mmol of cyclopentadienyltitanium trichloride and 30 mmol of methylaluminoxane was used, and p-fluorostyrene was used as the starting material and polymerized under the conditions shown in Table 4. The poly(p-fluorostyrene) thus produced was extracted with methyl ethyl ketone in the same manner as in Example 2. Properties of the poly(p-fluorostyrene) are shown in Table 4. A $^{13}$C-NMR spectrum (aromatic ring $C_1$ carbon signal) of the poly(p-fluorostyrene) is shown in FIG. 1 (j).

TABLE 4

| Example | Monomer Type | Monomer Amount (ml) | Solvent Type | Solvent Amount (ml) | Temp. (°C.) | Time (hours) | Yield (g) | Polymer Extraction Residue (wt %) | Mw | Mn | Syndiotacticity*1 | Remarks |
|---|---|---|---|---|---|---|---|---|---|---|---|---|
| 1 | Styrene | 180 | Toluene | 100 | 20 | 1 | 16.5 | 97 | 280,000 | 57,000 | >96 | Product (m.p. 260) |
| 2 | " | 100 | " | 100 | 50 | 8 | 0.2 | 21 | 678,000 | 272,000 | 86 | Extraction residue |
| 3 | " | 180 | " | 100 | 50 | 2 | 6.7 | 92 | 348,000 | 156,000 | 99 | Extraction residue |
| 4 | " | 100 | " | 100 | 50 | 2 | 0.4 | 42 | 100,000 | 36,000 | 96 | Extraction residue |
| 5 | " | 50 | " | 100 | 50 | 2 | 0.67 | 75 | 388,000 | 124,000 | 91 | Extraction residue |
| 6 | " | 50 | " | 100 | 50 | 2 | 0.42 | 32 | 239,000 | 115,000 | 96 | Extraction residue |
| 7 | " | 50 | " | 100 | 50 | 2 | 1.2 | 88 | 256,000 | 121,000 | 97 | Extraction residue |
| 8 | " | 50 | " | 100 | 50 | 2 | 1.08 | 70 | 517,000 | 220,000 | 74 | Extraction residue |
| 9 | " | 50 | " | 100 | 50 | 2 | 1.63 | 84 | 600,000 | 230,000 | 38 | Extraction residue |
| 10 | " | 50 | " | 100 | 50 | 2 | 0.41 | 30 | 871,000 | 413,000 | 58 | Extraction residue |
| 11 | " | 50 | " | 200 | 50 | 2 | 0.35 | 30 | 174,000 | 68,000 | 75 | Extraction residue |
| 12 | " | 50 | " | 200 | 50 | 2 | 0.5 | 41 | 204,000 | 22,000 | 85 | Extraction residue |
| 13 | " | 100 | " | 100 | 50 | 2 | 0.5 | 41 | 163,000 | 19,000 | 31 | Extraction residue |
| 14 | " | 150 | " | 20 | 20 | 6 | 3.0 | 84 | 2,480,000 | 995,000 | >96 | Extraction residue |
| 15 | " | 150 | " | 20 | 30 | 7 | 8.9 | 99 | 1,893,000 | 773,000 | >96 | Extraction residue |
| 16 | " | 150 | " | 20 | 40 | 3 | 12.5 | 96 | 1,244,000 | 358,000 | >96 | Extraction residue |
| 17 | " | 150 | " | 20 | 50 | 4 | 15.7 | 94 | 613,000 | 288,000 | >96 | Extraction residue |
| 18 | " | 50 | Benzene | 100 | 50 | 4 | 1.9 | 89 | 301,000 | 96,000 | >96 | Extraction residue |
| 19 | Styrene | 50 | p-Xylene | 100 | 50 | 2 | 1.8 | 92 | 201,000 | 101,000 | >96 | Extraction residue |
| 20 | " | 75 | Toluene | 75 | 50 | 6 | 3.3 | 86 | 407,000 | 193,000 | >96 | Extraction residue |
| 21 | " | 100 | " | 200 | 50 | 3.5 | 0.4 | 11 | 9,700 | 3,900 | 8 | Extraction residue |
| 22 | " / p-Methyl-styrene | 53.1 / 5.2 | " | 100 | 50 | 2 | 17.8 | 76 | 79,000 | 45,000 | 72*2 | Extraction residue |
| 23 | p-Methyl-styrene | 80 | " | 100 | 50 | 1 | 16.0 | 55 | 48,000 | 23,000 | 94 | Extraction residue (m.p. 173° C.) |

TABLE 4-continued

| Example | Monomer Type | Monomer Amount (ml) | Solvent Type | Solvent Amount (ml) | Polymerization Conditions Temp. (°C.) | Polymerization Conditions Time (hours) | Yield (g) | Polymer Extraction Residue (wt %) | Properties of Polymer Molecular Weight Mw | Properties of Polymer Molecular Weight Mn | Syndiotactivity[1] | Remarks |
|---|---|---|---|---|---|---|---|---|---|---|---|---|
| | | | | | | | | | 33,000 | 14,000 | — | Extraction residue (m.p. 168° C.) |
| 24 | m-Methyl-styrene | 17 | " | 100 | 50 | 3 | 15.1 | 98 | 59,000 | 26,000 | 92 | Extraction residue (m.p. 206° C.) |
| 25 | p-tert-Butyl-styrene | 27 g | " | 100 | 50 | 4 | 25.3 | 99 | 71,000 | 21,000 | 94 | Extraction residue (m.p. 310° C.) |
| 26 | p-Chloro-styrene | 40 | " | 100 | 20 | 2 | 1.7 | 90 | 20,000 | 2,000 | 91 | Extraction residue (m.p. 298° C.) |
| 27 | m-Chloro-styrene | 25 | " | 100 | 50 | 9 | 1.8 | 51 | 47,000 | 13,000 | 80 | Extraction residue |
| 28 | p-Fluoro-styrene | 24 | " | 50 | 5 | 0.2 | — | 29,000 | 88,000 | 70 | Extraction residue | |

[1]Expressed in the racemic pentad.
[2]Expressed in the racemic pentad in the styrene structure unit.

COPOLYMERS ("C") Examples below)

EXAMPLE 1 C (1) Preparation of Organoaluminum Compound Component (b) 47.4 ml (0.492 mol) of trimethylaluminum and 35.5 g (0.142 mol) of copper sulfate pentahydrate were reacted at 20° C. for 24 hours in 200 ml of a toluene solvent, and then solids were removed to obtain a toluene solution containing 12.4 g of methylaluminoxane as the organoaluminum compound component (b). The molecular weight of the methylaluminoxane as determined by the benzene cryoscopic method was 721.

(2) Production of Styrene/p-Methylstyrene Copolymer 60 ml of toluene and 5 mmol (as aluminum atom) of the methylaluminoxane obtained in (1) above were placed in a 500-mililiter glass vessel equipped with a stirrer, and then 0.05 mmol of tetraethoxytitanium was added thereto. The resulting solution was heated. At 50° C., a mixture of 475 mmol of styrene and 25 mmol of p-methylstyrene was added, and then polymerization was performed for 2 hours. At the end of the time, methanol was injected to stop the reaction. Then a mixture of hydrochloric acid and methanol was added to decompose the catalyst component. The yield of the styrene copolymer thus obtained was 8.2 g.

The styrene copolymer was introduced in a Soxhlet extractor and extracted with methyl ethyl ketone for 4 hours. The insoluble content was 99 wt %. For this methyl ethyl ketone-insoluble styrene copolymer, the p-methylstyrene content was 7 mol %, the weight average molecular weight was 360,000, the number average molecular weight was 200,000, and the melting point was 246° C.

Aromatic ring $C_1$ carbon signals of the $^{13}$C-NMR spectrum (a nuclear magnetic resonance spectrum using carbon isotope) of the above methyl ethyl ketone-insoluble styrene copolymer are shown in FIG. 1A($a_1$); methine-methylene carbon signals of the $^{13}$C-NMR spectrum, in FIG. 1A($a_2$); and the $^1$H-NMR spectrum (a proton nuclear magnetic resonance spectrum), in FIG. 1A($b$).

COMPARATIVE EXAMPLE 1C

A monomer mixture of styrene and p-methylstyrene (95:5 by mol) was polymerized at 60° C. using an organic peroxide to obtain an atactic styrene copolymer. This styrene copolymer was wholly soluble in methyl ethyl ketone, contained 6 mol % of p-methylstyrene, and had no melting point and had a glass transition temperature of 83° C.

Aromatic ring $C_1$ carbon signals of the $^{13}$C-NMR spectrum of the above styrene copolymer are shown in FIG. 2A.

COMPARATIVE EXAMPLE 2C

In the presence of a catalyst consisting of 2.5 mmol of a titanium catalyst component which had been prepared by reacting 10.0 g of magnesium ethoxide and 50 ml of titanium tetrachloride, 12.5 mmol of triethylaluminum and 12.5 mmol of diethylaluminum chloride, 190 mmol of styrene and 10 mmol of p-methylstyrene were polymerized 50° C. for 2 hours in a heptane solvent to obtain 3.19 g of a copolymer. This copolymer was extracted with methyl ethyl ketone in the same manner as in Example 1C(2) to obtain an isotactic styrene copolymer which was insoluble in methyl ethyl ketone. This copolymer contained 7 mol % of p-methylstyrene and had a melting point of 217° C.

Aromatic ring $C_1$ carbon signals of the $^{13}$C-NMR spectrum of the above copolymer are shown in FIG. 3A.

As described in Japanese Patent Application Laid-open No. 104318/1987, the melting points of syndiotactic polystyrene and syndiotactic poly(p-methylstyrene) are 260°-270° C. and 173° C., respectively.

Aromatic $C_1$ carbon signals of the $^{13}$C-NMR spectra of the syndiotactic polystyrene and the syndiotactic poly(p-methylstyrene) are shown in FIG. 4A($a_1$) and 4A($a_2$), respectively; methine-methylene carbon signals of the $^{13}$C-NMR spectra of the syndiotactic polystyrene and the syndiotactic poly(p-methylstyrene) are shown in FIG. 5A($a_1$) and FIG. 5A($a_2$), respectively; and $^1$H-NMR spectra of the syndiotactic polystyrene and the syndiotactic poly(p-methylstyrene) are shown in FIG. 4A($b$) and FIG. 5A($b$), respectively.

Based on the analytical results of the above copolymer, the analytical results of the atactic styrene copolymer obtained in Comparative Example 1C and of the isotactic styrene copolymer obtained in Comparative Example 2C, and further by comparing with the syndiotactic polystyrene and syndiotactic poly(p-methylstyrene) as described in Japanese Patent Application Laid-open No. 104818/1987, it was confirmed that the styrene copolymer obtained in Example 1C had a cosyndiotactic structure (1) $^{13}$C-NMR Analysis (i) Aromatic Ring $C_1$ Carbon Signals It is well known that the splitting of aromatic ring $C_1$ carbon signals is ascribable to a polymer microstructure. The found values of the styrene copolymer obtained in Example 1, the atactic styrene copolymer obtained in Comparative Example 1 and the isotactic styrene copolymer obtained in Comparative Example 2C, and the values of the syndiotactic polystyrene and syndiotactic poly(p-methylstyrene) as described in Japanese Patent Application Laid-open No. 104818/1987 are summarized in Table 1C.

The $C_1$ carbon signals of the styrene polymer in the styrene copolymer obtained in Example 1C were at 145.11 ppm and 145.22 ppm. The signal at 145.11 ppm indicates the syndiotactic chain of styrene pendant. On the other hand, the signal at 145.22 ppm was not found in the copolymers of Comparative Examples 1C and 2C, it is a signal ascribable to the co-syndiotactic structure. The $C_1$ carbon signal of p-methylstyrene of the styrene copolymer obtained in Example 1C was at 142.9 ppm. Since this signal appeared at a high magnetic field as compared with those of the copolymer of Comparative Example 2C and of syndiotactic poly(p-methylstyrene) it was confirmed that the styrene copolymer had a co-syndiotactic structure.

(ii) Methine-Methylene Carbon Signals

It is known that he methine-methylene carbon signal corresponds to the microstructure of a polymer. The methylene signal of the styrene copolymer obtained in Example 1C, the methine signal of the styrene portion, and the methine signal of the p-methylstyrene portion were at 44.69 ppm, 41.08 ppm and 40.65 ppm, respectively. As can be seen by comparison of syndiotactic polystyrene with syndiotactic poly(p-methylstyrene), it was confirmed that the styrene copolymer obtained in Example 1C had a syndiotactic structure.

(2) $^1$H-NMR Analysis

In the styrene copolymer obtained in Example 1C, the syndiotactic polystyrene and the syndiotactic poly(p-styrene), only one signal was detected for each of methine and methylene proton in the polymer chain. Thus it was confirmed that 100% of the styrene copolymer was of the syndiotactic structure.

(3) Melting Point

The melting point of the styrene copolymer obtained in Example 1C was 246° C., which was intermediate between the melting point (260°–270° C.) of the syndiotactic polystyrene and the melting point (173° C.) of the syndiotactic poly(p-methylstyrene), and which was higher than the melting point (217° C.) of an equimolar amount of p-methylstyrene-containing isotactic polystyrene copolymer as obtained in Comparative Example 2C. Thus it was confirmed that the styrene copolymer was a co-syndiotactic styrene copolymer.

(4) Monomer Reactivity Ratio

It is known that monomer reactivity ratios, $r_1$ and $r_2$, are important indexes indicating a monomer chain distribution in the copolymer chain (see *Coplymerization 1, Reaction Analysis*, pp. 6–8, edited by Kobunshi Gakkai, Tokyo Japan). Polymerization was performed several times in the same manner as in Example 1C except that the ratio of charged monomers was changed and the degree of polymerization was controlled at a lower level (not more than 5%). On basis of the compositions of the copolymers obtained, the monomer reactivity ratio was determined by the curve fitting method. It was found that $r_1$ (styrene)=0.420, $r_2$ (p-methylstyrene)=1.568, and the product of $r_1$ and $r_2$ i.e., $r_1.r_2$, was 0.659. these values showed that the styrene copolymer obtained in Example 1 was a random copolymer, and further supported the results of the $^{13}$C-NMR spectrum.

Summarizing the results of (1), (2), (3) and (4) above, it was confirmed that the styrene copolymer obtained in Example 1C had a substantially co-syndiotactic stereostructure.

TABLE 1C

| Run No. | p-Methylstyrene Content (mol %) | Aromatic Ring $C_1$ Carbon Signals ($^{13}$C—NMR) | |
|---|---|---|---|
| | | Styrene $C_1$ (ppm) | p-Methylstyrene $C_1$ (ppm) |
| Example 1C | 7 | 145.11 145.22 | 142.09 |
| Comparative Example 1C | 6 | 145.1–146.1 | — |
| Comparative Example 2C | 7 | 146.26 146.37 | 143.15 |
| Syndiotactic Polystyrene | 0 | 145.11 | — |
| Syndiotactic Poly(p-methylstyrene) | 100 | — | 142.40 |

EXAMPLE 2C

A styrene copolymer was produced in the same manner as in Example 1 (2) except that a mixture of 250 mmol of styrene and 250 mmol of p-methylstyrene was used as the monomer feed. The styrene copolymer thus obtained was extracted with methyl ethylene ketone.

The properties of the styrene copolymer are shown in Table 2C, and aromatic ring $C_1$ carbon signals of the $^{13}$C-NMR spectrum of the styrene copolymers are shown in FIG. 6A.

EXAMPLE 3C

A styrene copolymer was produced in the same manner as in Example 1C(2) except that a mixture of 50 mmol of styrene and 450 mmol of p-methylstyrene was used as the monomer feed. The styrene copolymer thus obtained was extracted with methyl ethyl ketone.

The properties of the styrene copolymer are shown in Table 2C, and aromatic ring $C_1$ carbon signals of the $^{13}$C-NMR spectrum of the styrene copolymer are shown in FIG. 7A.

EXAMPLE 4C

A styrene copolymer was produced in the same manner as in Example 1C(2) except that a catalyst consisting of 0.02 mmol of cyclopentadienyltitanium trichloride and 10 mmol (as aluminum atom) of methylaluminoxane was used as the catalyst and a mixture of 450 mmol of styrene and 50 mmol of p-methylstyrene was used as the monomer feed. The styrene copolymer thus obtained was extracted with methyl ethyl ketone.

The properties of the styrene copolymer are shown in Table 2C and aromatic ring $C_1$ carbon signals of the $^{13}$C-NMR spectrum of the styrene copolymer are shown in FIG. 8A.

EXAMPLE 5C

A styrene copolymer was produced in the same manner as in Example 1C(2) except that a mixture of 475 mmol of styrene and 25 mmol of p-tert-butylstyrene was used as the monomer feed. The styrene copolymer was extracted with methyl ethyl ketone.

The properties of the styrene copolymer are shown in Table 2C and aromatic ring $C_1$ carbon signals and $C_4$ carbon signals of the $^{13}$C-NMR spectrum of the styrene copolymer are shown in FIG. 9A(a), and the $^1$H-NMR spectrum is shown in FIG. 9A(b).

EXAMPLE 6C

A styrene copolymer was produced in the same manner as in Example 1C(2) except that a catalyst consisting of 0.05 mmol of tetraethoxytitanium and 40 mmol (as aluminum atom) of methylaluminoxane was used as the catalyst, a mixture of 250 mmol of styrene and 250 mmol of p-tert-butylstyrene was used as the monomer feed, and polymerization was performed for 4 hours. The styrene copolymer thus obtained was extracted with methyl ethyl ketone.

The properties of the styrene copolymer are shown in Table 2C, and aromatic ring $C_1$ carbon signals and $C_4$ carbon signals of the $^{13}$C-NMR spectrum of the styrene copolymer are shown in FIG. 10A.

For comparison, $C_1$ carbon signals and $C_4$ carbon signals of the syndiotactic poly(p-tert-butylstyrene) described in Japanese Patent Application Laid-open No. 104818/1987 are shown in FIG. 11A(b) and the $^1$H-NMR spectrum is shown in FIG. 11A(b).

EXAMPLE 7C

A styrene copolymer was produced in the same manner as in Example 1C (2) except that a mixture of 450 mmol of styrene and 50 mmol of m-methylstyrene was used as the monomer feed. The styrene copolymer thus obtained was extracted with methyl ethyl ketone.

The properties of the styrene copolymer are shown in Table 2C, Aromatic ring $C_1$ carbon signals of the $^{13}$C-NMR spectrum of the styrene copolymer are shown in FIG. 12A(a), and the $^1$H-NMR spectrum is shown in FIG. 12A(b).

EXAMPLE 8C

A styrene copolymer was produced in the same manner as in Example 7C except that a mixture of 125 mmol of styrene and 125 mmol of m-methylstyrene was used as the monomer feed. The styrene copolymer thus obtained was extracted with methyl ethyl ketone.

The properties of the styrene copolymer are shown in Table 2C, and aromatic ring $C_1$ carbon signals of the $^{13}$NMR spectrum of the styrene copolymer are shown in FIG. 13.

For comparison, $C_1$ carbon signals of the $^{13}$C-NMR spectrum of the syndiotactic poly(m-methylstyrene) described in Japanese Patent Application Laid-open No. 104818/1987 are shown in FIG. 14A(a), and the $^1$H-NMR spectrum is shown in FIG. 14A(b).

EXAMPLE 9C

A styrene copolymer was produced in the same manner as in Example 1C(2) except that a catalyst consisting of 0.025 mmol of cyclopentadienyltitanium trichloride and 20 mmol (as aluminum atom) of methylaluminoxane was used as the catalyst and a mixture of 125 mmol of styrene and 125 mmol of p-fluorostyrene was used as the monomer feed. The styrene copolymer thus obtained was extracted with methyl ethyl ketone.

The properties of the styrene copolymer are shown in Table 2C and aromatic ring $C_1$ carbon signals of the $^{13}$C-NMR spectrum of the styrene copolymer are shown in FIG. 15A.

For comparison, $C_1$ carbon signals of the $^{13}$C-NMR spectrum of the syndiotactic poly(p-fluorostyrene) described in Japanese Patent Application Laid-open No. 104818/1987 are shown in FIG. 16A.

EXAMPLE 10C

A styrene copolymer was produced in the same manner as in Example 1C(2) except that a catalyst consisting of 0.05 mmol of cyclopentadienyltitanium trichloride and 5 mmol (as aluminum atom) of methylaluminoxane was used as the catalyst and a mixture of 250 mmol of styrene and 167 mmol of p-chlorostyrene was used as the monomer feed. The styrene copolymer thus obtained was extracted with methyl ethyl ketone.

The properties of the styrene copolymer are shown in Table 2 and aromatic ring $C_1$ carbon signals of the $^{13}$C-NMR spectrum of the styrene copolymer are shown in FIG. 17A.

EXAMPLE 11C

A styrene copolymer was produced in the same manner as in Example 1C(2) except that a catalyst consisting of 0.05 mmol of cyclopentadienyltitanium trichloride and 40 mmol (as aluminum atom) of methylaluminoxane was used as the catalyst, a mixture of 150 mmol of styrene and 350 mmol of p-chlorostyrene was used as the monomer feed, and polymerization was performed for 4 hours. The styrene copolymer thus obtained was extracted with methyl ethyl ketone.

The properties of the styrene copolymer were shown in Table 2C, and aromatic ring $C_1$ carbon signals of the $^{13}$C-NMR spectrum of the styrene copolymer are shown in FIG. 18A.

For comparison, $C_1$ carbon signals of the $^{13}$C-NMR spectrum of the syndiotactic poly(p-chlorostyrene) described in Japanese Patent Application Laid-open No. 104818/1987 are shown in FIG. 19A.

EXAMPLE 12C

A styrene copolymer was produced in the same manner as in Example 9C except that a mixture of 125 mmol of styrene and 125 mmol of p-bromostyrene was used as the monomer feed. The styrene copolymer thus obtained was extracted with methyl ethyl ketone.

The properties of the styrene copolymer are shown in Table 2C and aromatic ring $C_1$ carbon signals of the $^{13}$C-NMR spectrum of the styrene copolymer are shown in FIG. 20.

For comparison, $C_1$ carbon signals of the $^{13}$C-NMR spectrum of the syndiotactic poly(p-bromostyrene) described in Japanese Patent Application Laid-open No. 104818/1987 are shown in FIG. 21A.

TABLE 2C

| Run No. | Catalyst Type | Amount (mmol) | Methyl aluminoxane (mmol) | Polymerization Conditions Time (min) | Temperature (°C.) | Monomer Styrene (mmol) | Comonomer Type | Amount (mmol) |
|---|---|---|---|---|---|---|---|---|
| Example 1C | Ti(OEt)$_4$*$^4$ | 0.05 | 5 | 120 | 50 | 475 | p-methylstyrene | 25 |
| Example 2C | Ti(OEt)$_4$*$^1$ | 0.05 | 5 | 120 | 50 | 250 | p-methylstyrene | 250 |
| Example 3C | Ti(OEt)$_4$*$^1$ | 0.05 | 5 | 120 | 50 | 50 | p-methylstyrene | 450 |
| Example 4C | CpTiCl$_3$*$^2$ | 0.02 | 10* | 120 | 50 | 450 | p-methylstyrene | 50 |
| Example 5C | Ti(OEt)$_4$*$^1$ | 0.05 | 5 | 120 | 50 | 475 | p-tert-butylstyrene | 25 |
| Example 6C | Ti(OEt)$_4$*$^1$ | 0.05 | 40 | 240 | 50 | 250 | p-tert-butylstyrene | 250 |
| Example 7C | Ti(OEt)$_4$*$^1$ | 0.05 | 5 | 240 | 50 | 450 | p-methylstyrene | 50 |
| Example 8C | Ti(OEt)$_4$*$^1$ | 0.05 | 5 | 240 | 50 | 125 | m-methylstyrene | 125 |
| Example 9C | CpTiCl$_3$2$^2$ | 0.025 | 20 | 120 | 50 | 125 | p-fluorostyrene | 125 |
| Example 10C | CpTiCl$_3$*$^2$ | 0.05 | 5 | 120 | 50 | 250 | p-chlorostyrene | 167 |
| Example 11C | CpTiCl$_3$*$^2$ | 0.05 | 40 | 240 | 50 | 150 | p-chlorostyrene | 350 |
| Example 12C | CpTiCl$_3$*$^2$ | 0.025 | 20 | 120 | 50 | 125 | p-bromostyrene | 125 |

| Run No. | Properties of Styrene Copolymer Yield (g) | Extraction Residue (wt %) | Comonomer Content (mole %) | Molecular Weight Me*$^3$ | Mn*$^4$ | Transition Temperature Tg*$^5$ (°C.) | Tm*$^6$ (°C.) |
|---|---|---|---|---|---|---|---|
| Example 1C | 8.2 | 99 | 7 | 360,000 | 200,000 | 100 | 246 |
| Example 2C | 11.1 | 57 | 63 | 230,000 | 99,000 | 104 | — |
| Example 3C | 3.0 | 20 | 80 | 260,000 | 77,000 | 109 | 172 |
| Example 4C | 17.8 | 77 | 14 | 79,000 | 45,000 | 98 | 198 |
| Example 5C | 7.3 | 77 | 7 | 390,000 | 210,000 | 103 | 215 |
| Example 6C | 39 | 35 | 53 | 93,000 | 37,000 | 124 | — |
| Example 7C | 1.7 | 84 | 21 | 390,000 | 38,000 | 91 | 232 |
| Example 8C | 1.1 | 71 | 63 | 320,000 | 120,000 | 80 | 185 |

TABLE 2C-continued

| Example 9C | 12.3 | 69 | 6 | 49,000 | 19,000 | 97 | 253 |
|---|---|---|---|---|---|---|---|
| Example 10C | 8.7 | 82 | 5 | 65,000 | 41,000 | 97 | 240 |
| Example 11C | 21.2 | 31 | 26 | 35,000 | 11,000 | 92 | 185 |
| Example 12C | 4.9 | 64 | 7 | 58,000 | 38,000 | 99 | 228 |

[1] Tetraethoxytitanium
[2] Cyclopentadienyltitanium trichloride
[3] Weight average molecular weight
[4] Number average molecular weight
[5] Glass transition point
[6] Melting point The styrene polymers of the present invention are novel polymers. The copolymers have a co-syndiotactic stereostructure that has not been obtained in the art. The styrene polymers (both homo and copolymers) have highly syndiotactic stereostructure. Thus, the styrene polymers of the present invention are much superior in heat resistance to commonly used styrene polymers such as atactic polystyrene and other styrene homo and copolymers, and further are excellent in chemical resistance. Accordingly, the styrene polymers of the present invention can be utilized as materials for production of articles satisfying the above requirements. Moreover, when a functional substituent is introduced in the side chain of benzene ring, the resulting styrene polymers can be widely used as functional polymers.

Additional methods by which the syndiotactic homopolymers and copolymers of the present invention can be produced are described in Gazetta Chemica Italiana, 117, 249-250 (1987); Marcromolecules 1989, 22, 2129-2130; U.S. Pat. No. 4,808,680 to Schmidt et al; and U.S. Pat. No. 4,774,301 to Campbell, Jr. et al.

According to Campbell a catalyst is used which is the reaction product of polymethylaluminoxane and a zirconium (IV) complex corresponding to the formula: $ZrXR_3$, wherein X is halide or R, and R is independently each occurrence selected from the ligand group of alkoxides and aryloxides corresponding to the formula: OR', amides corresponding to the formula: $NR'_2$, phosphides corresponding to the formula: $PR'_2$, and $\beta$-diketonates corresponding to the formula: R'—C(O)—CH—C(O)—R', and R' is alkyl or aryl of up to 12 carbons for a process for the preparation of polymers of vinyl aromatic monomers having a high degree of syndiotacticity.

According to Schmidt a catalyst is used which is the reaction product of polymethylaluminoxane and a cyclopentadienyl zirconium (IV) complex corresponding to the formula: $CpZrR_3$, wherein Cp is a $\pi$-bonded cyclopentadienyl or substituted cyclopentadienyl ligand having from 5 to 20 carbons, and R is independently each occurrence selected from the ligand group of halides: alkoxides and aryloxides corresponding to the formula: OR'; amides corresponding to the formula: $NR'_2$; phosphides corresponding to the formula: $PR'_2$; and $\beta$-diketonates corresponding to the formula: R'—C(O)—CH—C(O)—R', and R' is alkyl or aryl of up to 12 carbons for a process for the preparation of polymers of vinyl aromatic monomers having a high degree of syndiotacticity.

The Macromolecules article, by Zambelli et al, describes testing of a number of transition metal (Ti and Zr) compounds/methylaluminoxane catalytic mixtures for their effectiveness to cause the syndiotactic polymerization of styrene.

The Gazetta Chemica Italiana article, by Grassi et al, reports highly selective synthesis of syndiotactic polystyrene using soluble titanium or zirconium compounds with methyaluminoxane.

The present invention has been described in the above reference to specific embodiments. However, it would be obvious to persons skilled in the art that various changes and modifications to the embodiments may be made, which fall within the scope claimed for the invention as set out in the appended claims. The above specification should therefore be interpreted in a descriptive and not in a limitive sense.

What is claimed is:

1. A syndiotactic styrene polymer having a repeating unit represented by the general formula (I):

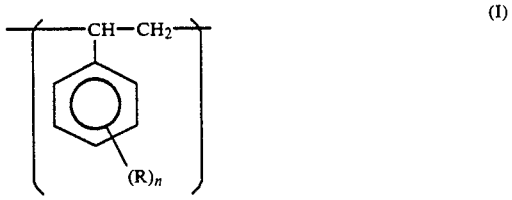

wherein R is selected from the group consisting of hydrogen, halogen, $C_1$-$C_{20}$ alkyl, halogen substituted $C_1$-$C_{20}$ alkyl and $C_1$-$C_{10}$ alkoxy, n is an integer of 1 to 3, wherein said styrene polymer has a degree of polymerization of not less than 5, and mainly syndiotactic stereoregularity.

2. The syndiotactic styrene copolymer of claim 1, wherein the syndiotacticity in terms of the racemic pentad is not less than 50%.

3. The syndiotactic styrene polymer of claim 1, which is a polymer selected from the group consisting of polystyrene, poly(alkyl-styrene), poly(halogenated styrene), poly(halogen-substituted alkylstyrene), poly(alkoxystyrene).

4. The syndiotactic polymer of claim 1, wherein said polymer is syndiotactic polystyrene.

5. The syndiotactic styrene polymer of claim 1 wherein said polymer is styrene-p-methylstyrene copolymer.

* * * * *